US012786853B2

(12) United States Patent
Elazzouni et al.

(10) Patent No.: US 12,786,853 B2
(45) Date of Patent: Nov. 3, 2026

(54) NETWORK NODE SELECTION BY A USER EQUIPMENT (UE) USING ONE OR MORE PROBABILITY VALUES

(71) Applicant: QUALCOMM Incorporated, San Diego, CA (US)

(72) Inventors: Sherif Elazzouni, San Diego, CA (US); Navid Abedini, Basking Ridge, NJ (US); Shankar Krishnan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 476 days.

(21) Appl. No.: 18/339,233

(22) Filed: Jun. 21, 2023

(65) Prior Publication Data

US 2024/0430784 A1 Dec. 26, 2024

(51) Int. Cl.
*H04W 48/12* (2009.01)
*H04W 48/20* (2009.01)
(Continued)

(52) U.S. Cl.
CPC ........... *H04W 48/12* (2013.01); *H04W 48/20* (2013.01); *H04W 36/362* (2023.05); *H04W 74/0833* (2013.01)

(58) Field of Classification Search
CPC .............................. H04W 48/12; H04W 48/20
(Continued)

(56) References Cited

U.S. PATENT DOCUMENTS 11,490,282 B2 11/2022 Jha et al.
2020/0187084 A1* 6/2020 Fujishiro ............... H04W 16/08
(Continued)

FOREIGN PATENT DOCUMENTS

CN 101583164 B 12/2011
EP 2056609 A1 5/2009
(Continued)

OTHER PUBLICATIONS

3GPP TR 37.868: 3rd Generation Partnership Project, Technical Specification Group Radio Access Network, Study on RAN Improvements for Machine-type, Communications, (Release 10), V0.5.0 (Jul. 2010), R2-104207, 3GPP, Mobile Competence Centre, 650, Route Des Lucioles, F-06921 Sophia-Antipolis Cedex, France, 18 Pages, May 15, 2014, XP050816272, Section 5.1.1, Access Class Barring schemes.

(Continued)

*Primary Examiner* — Faisal Choudhury

(74) *Attorney, Agent, or Firm* — Norton Rose Fulbright US LLP

(57) ABSTRACT

In some aspects, a network node may transmit access information indicating one or more probability values that are respectively associated with one or more network nodes. The probability values may be selected to "guide" or "steer" one or more UEs to select an anchor node and/or a non-anchor node for communication. As an illustrative example, if a first probability value associated with a first network node is 0.75, and if a second probability value associated with a second network node is 0.25, a UE may select the first network node with a probability of 75 percent and may select the second network node with a probability of 25 percent. In some implementations, an anchor node of the UE may transmit the access information via a system information block of type one (SIB1) that indicates the probability values.

64 Claims, 12 Drawing Sheets

(51) Int. Cl.
*H04W 36/36* (2009.01)
*H04W 74/0833* (2024.01)

(58) Field of Classification Search
USPC .......................................................... 370/252
See application file for complete search history.

(56) References Cited

U.S. PATENT DOCUMENTS

| | | | | |
|---|---|---|---|---|
| 2022/0124514 | A1* | 4/2022 | Lee | H04B 7/0632 |
| 2023/0051540 | A1 | 2/2023 | Sui et al. | |
| 2023/0091349 | A1* | 3/2023 | Shirahatti | G01S 19/21 370/329 |
| 2023/0140473 | A1* | 5/2023 | Paredes Cabrera | H04W 36/008375 455/456.1 |
| 2024/0334310 | A1* | 10/2024 | Niu | H04L 5/001 |
| 2025/0039728 | A1* | 1/2025 | Martin | H04W 52/0235 |
| 2025/0233675 | A1* | 7/2025 | Mu | H04L 43/16 |

FOREIGN PATENT DOCUMENTS

| | | | |
|---|---|---|---|
| EP | 3498007 | B1 | 12/2019 |
| WO | WO-2021114123 | A1 | 6/2021 |

OTHER PUBLICATIONS

Partial International Search Report—PCT/US2024/030796—ISA/EPO—Sep. 16, 2024.
International Search Report and Written Opinion—PCT/US2024/030796—ISA/EPO—Nov. 7, 2024.
Kanj M., et al., "A Tutorial on NB-IoT Physical Layer Design", IEEE Communications Surveys & Tutorials, Sep. 2020, vol. 22, No. 4, pp. 1-39.

* cited by examiner

NETWORK NODE SELECTION BY A USER EQUIPMENT (UE) USING ONE OR MORE PROBABILITY VALUES

TECHNICAL FIELD

Aspects of the present disclosure relate generally to wireless communication systems, and more particularly, to selection of network nodes within wireless communication systems.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of network nodes (such as base stations), each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Some wireless communication systems use anchor network nodes and non-anchor network nodes to provide network energy savings (NES), enhanced coverage, or other features. For example, a UE may receive access information from an anchor node, such as a system information block of type one (SIB1). The UE may also communicate with a non-anchor node that provides data communications or other connectivity for the UE. In some examples, the non-anchor node may operate according to an NES mode of operation (such as a sleep state) until woken by a UE for a data communication.

In some circumstances, a relatively large number of UEs may select the same network node as an anchor or non-anchor network node for transmitting a message. The message may be an access message, such as a random access channel (RACH) message. As a result, the network node may experience a large amount of loading, which may introduce latency and which may reduce performance in the wireless communication system in some circumstances.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a user equipment (UE) for wireless communication. The UE includes one or more memories and one or more processors coupled with the one or more memories. The one or more processors individually or collectively are operable to receive, from a first network node, access information indicating one or more network nodes and further indicating one or more probability values respectively associated with accessing the one or more network nodes. The one or more processors individually or collectively are further operable to transmit a message to a second network node of the one or more network nodes in accordance with the one or more probability values.

Another innovative aspect of the subject matter described in this disclosure can be implemented in a method for wireless communication performed by a UE. The method includes receiving, from a first network node, access information indicating one or more network nodes and further indicating one or more probability values respectively associated with accessing the one or more network nodes. The method further includes transmitting a message to a second network node of the one or more network nodes in accordance with the one or more probability values.

Another innovative aspect of the subject matter described in this disclosure can be implemented in a network node for wireless communication. The network node includes one or more memories and one or more processors coupled with the one or more memories. The one or more processors individually or collectively are operable to transmit access information indicating one or more network nodes and further indicating the one or more probability values respectively associated with accessing the one more network nodes. The one or more processors individually or collectively are further operable to receive a message from a UE in accordance with the one or more probability values.

Another innovative aspect of the subject matter described in this disclosure can be implemented in a method for wireless communication performed by a network node. The method includes transmitting access information indicating one or more network nodes and further indicating one or more probability values respectively associated with accessing the one or more network nodes. The method further includes receiving a message from a UE in accordance with the one or more probability values.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
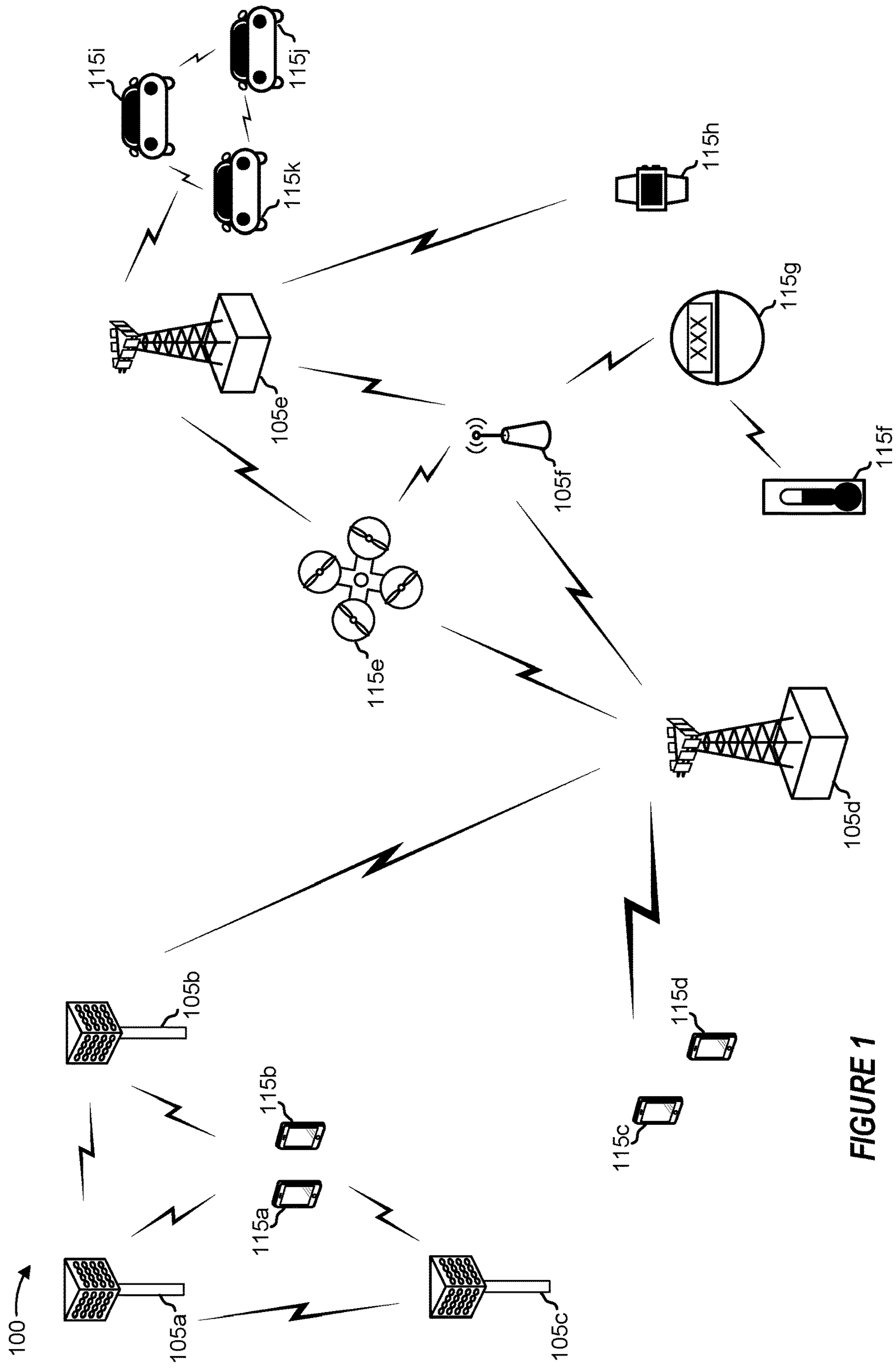
FIG. 1 is a block diagram illustrating details of an example wireless communication system that supports network node selection by a user equipment (UE) according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for network node selection by a user equipment (UE). In some aspects, a network node may transmit access information indicating one or more probability values that are respectively associated with one or more network nodes. The probability values may be selected to "guide" or "steer" one or more UEs to select an anchor node and/or a non-anchor node for accessing the network. As an illustrative example, if a first probability value associated with a first network node is 0.75, and if a second probability value associated with a second network node is 0.25, a UE may select the first network node with a probability of 75 percent and may select the second network node with a probability of 25 percent for transmitting a signal, such as a signal including a random access (RACH) message. In some implementations, an anchor node of the UE may transmit the access information via a system information block of type one (SIB1) that indicates the probability values.

Particular implementations of the subject matter described in this disclosure can be implemented to realize one or more of the following potential advantages. In some aspects, the disclosed techniques may reduce power consumption and increase network energy savings (NES). For example, if a relatively small number of UEs are to perform data communications, the UEs may be "steered" or "guided" to a relatively small number of first network nodes via the one or more probability values, such as one network node, two network nodes, or another number of network nodes. Such a technique may enable one or more second network nodes to operate according to an NES mode while the one or more first network nodes support the data communications.

Alternatively, or in addition, one or more implementations may reduce latency and/or may increase throughput in a wireless communication system. For example, if a larger number of UEs are to perform data communications, the UEs may be allocated to a larger number of network nodes via the one or more probability values, which may improve load balancing in the wireless communication system. In such examples, use of the probability values may reduce or avoid situations in which a relatively large number of UEs select the same network node as an anchor node or as a non-anchor node for transmitting a message. The message may be an access message, such as a RACH message. By reducing or avoiding such situations in which a relatively large number of UEs select the same node (such as by selecting the same node as an anchor or non-anchor node), load balancing may be improved, which may reduce latency and increase throughput in a wireless communication system.

In another aspect, a UE may select, or may avoid selecting, a network node (as, for example, an anchor or non-anchor node) in accordance with device type criteria, such as one or both of a type of a UE or a type of the network node. For example, a repeater device, an integrated access and backhaul (IAB) device, or a non-public network (NPN) device may be guided to or barred from anchor or non-anchor nodes. By "matching" UE devices and network devices in such a manner, resource allocation may be improved in a wireless communication system, such as by guiding UEs associated with a particular capability to a network node that supports the particular capability.

In another aspect, a colocation scheme may be associated with a set of network nodes including an anchor node and one or more non-anchor nodes collocated with the anchor node. The network nodes may support different respective coverage areas, such as associated with respective cell radii. To enable a UE to select among the network nodes, the anchor node may transmit access information (such as a SIB1) indicating different respective threshold signal strength values associated with the network nodes, such as different threshold reference signal received power (RSRP) threshold values. A UE may select among the network nodes in accordance with the threshold signal strength values. For example, the UE may select the anchor node if a signal strength value measured by the UE is greater than a first threshold signal strength value associated with the anchor node and is less than a second threshold signal strength value associated with a non-anchor node. Alternatively, in some other examples, the UE may select the non-anchor node if the measured signal strength value exceeds both the first threshold signal strength value and the second threshold signal strength value. In some such examples, if the non-anchor node is associated with a greater coverage area than the anchor node, then selection of the non-anchor node may improve performance, such as by avoiding a handoff from the anchor node to the non-anchor node in some circumstances (by enabling the UE to connect directly to the non-anchor node). As a result, by reducing or avoiding one or more handoffs, power consumption may be reduced and service continuity may be improved in some circumstances.

In another aspect, a UE may initiate a RACH procedure with an anchor node and may thereafter re-route the RACH procedure to a non-anchor node based on failure of the RACH procedure with the anchor node. In such examples, the UE may "default" to initiating the RACH procedure with the anchor node and may "fall back" to the non-anchor node. Such a technique may avoid waking a sleeping non-anchor node, reducing power consumption.

In another aspect, a UE may receive a message indicating one or more criteria for selection (or reselection) of an anchor or non-anchor node for a RACH procedure. For example, a message of type two (msg2) or a message of type four (msg4) associated with a RACH procedure may indicate whether a UE is to "re-route" the RACH procedure from an anchor node to a non-anchor node. As another example, a radio resource control (RRC) release message may indicate selection (or reselection) criteria for an anchor or non-anchor node. As an additional example, a downlink control information (DCI) message, such as a paging DCI message of type 1_0 (DCI1_0), may indicate the one or more criteria, such as by indicating whether the UE is to perform a RACH procedure with a non-anchor node. In some cases, performance may be improved using the one or more criteria, such as by selectively guiding UEs to network nodes to improve load balancing with in a wireless communication system.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. In some implementations, two or more wireless communications systems, also referred to as wireless communications networks, may be configured to provide or participate in authorized shared access between the two or more wireless communications systems.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10s of bits per see), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations **105*d* and 105*e* are regular macro base stations, while base stations 105***a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115*a*-115*d* of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115*e*-115*k* illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105*a*-105*c* serve the UEs 115*a* and 115*b* using 3D beamforming and coordinated spatial techniques, such as coordinated multipoint (CoMP) or multi-connectivity. Macro base station 105*d* performs backhaul communications with the base stations 105*a*-105*c*, as well as small cell, the base station 105*f*. Macro base station 105*d* also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115*c*, which is a drone. Redundant communication links with the UE 115*e* include from the macro base stations 105*d* and 105*e*, as well as small cell base station 105*f*. Other machine type devices, such as UE 115*f* (thermometer), the UE 115*g* (smart meter), and the UE 115*h* (wearable device) may communicate through the wireless network 100 either directly with base stations, such as the small cell base station 105*f*, and the macro base station 105*c*, or in multi-hop configurations by communicating with another user device which relays its information to the network, such as the UE 115*f* communicating temperature measurement information to the smart meter, the UE 115*g*, which is then reported to the network through the small cell base station 105*f*. The 5G network 100 may provide additional network efficiency through dynamic, low-latency TDD or FDD communications, such as in a vehicle-to-vehicle (V2V) mesh network between the UEs 115*i*-115*k* communicating with the macro base station 105*c*.

Figure 2:
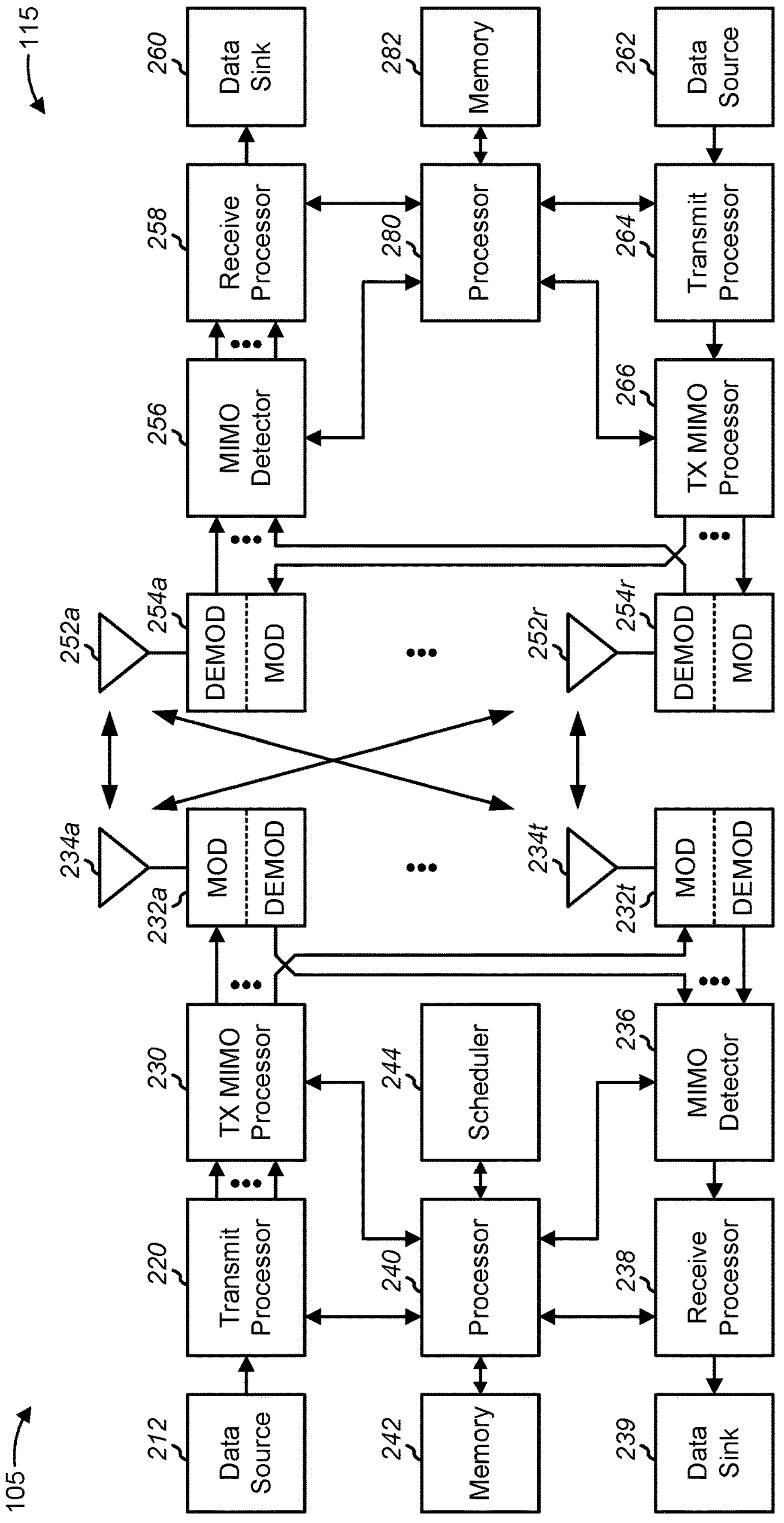
FIG. 2 is a block diagram illustrating examples of a base station and a UE that support network node selection by a UE according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105*f* in FIG. 1, and the UE 115 may be the UE 115*c* or 115*d* operating in a service area of the base station 105*f*, which in order to access the small cell base station 105*f*, would be included in a list of accessible UEs for the small cell base station 105*f*. Additionally, the base station 105 may be a base station of some other type. As shown in FIG. 2, the base station 105 may be equipped with antennas 234*a* through 234*t*, and the UE 115 may be equipped with antennas 252*a* through 252*r* for facilitating wireless communications.

At the base station 105, a transmit processor 220 may receive data from a data source 212 and control information from a processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254*a* through 254*r*, perform MIMO detection on the received symbols if applicable, and provide detected symbols. Receive processor 258 may process the detected symbols, provide decoded data for the UE 115 to a data sink 260, and provide decoded control information to a processor 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the processor 280. Additionally, the transmit processor 264 may generate reference symbols for a reference signal. The symbols from the transmit processor 264 may be precoded by TX MIMO processor 266 if applicable, further processed by the modulators 254*a* through 254*r* (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the processor 240.

The processors 240 and 280 may direct the operation at the base station 105 and the UE 115, respectively. The processor 240 or other processors and modules at the base station 105 or the processor 280 or other processors and modules at the UE 115 may perform or direct the execution of various processes for the techniques described herein, such as to initiate, perform, or control one or more operations illustrated in FIGS. 12 and 13, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
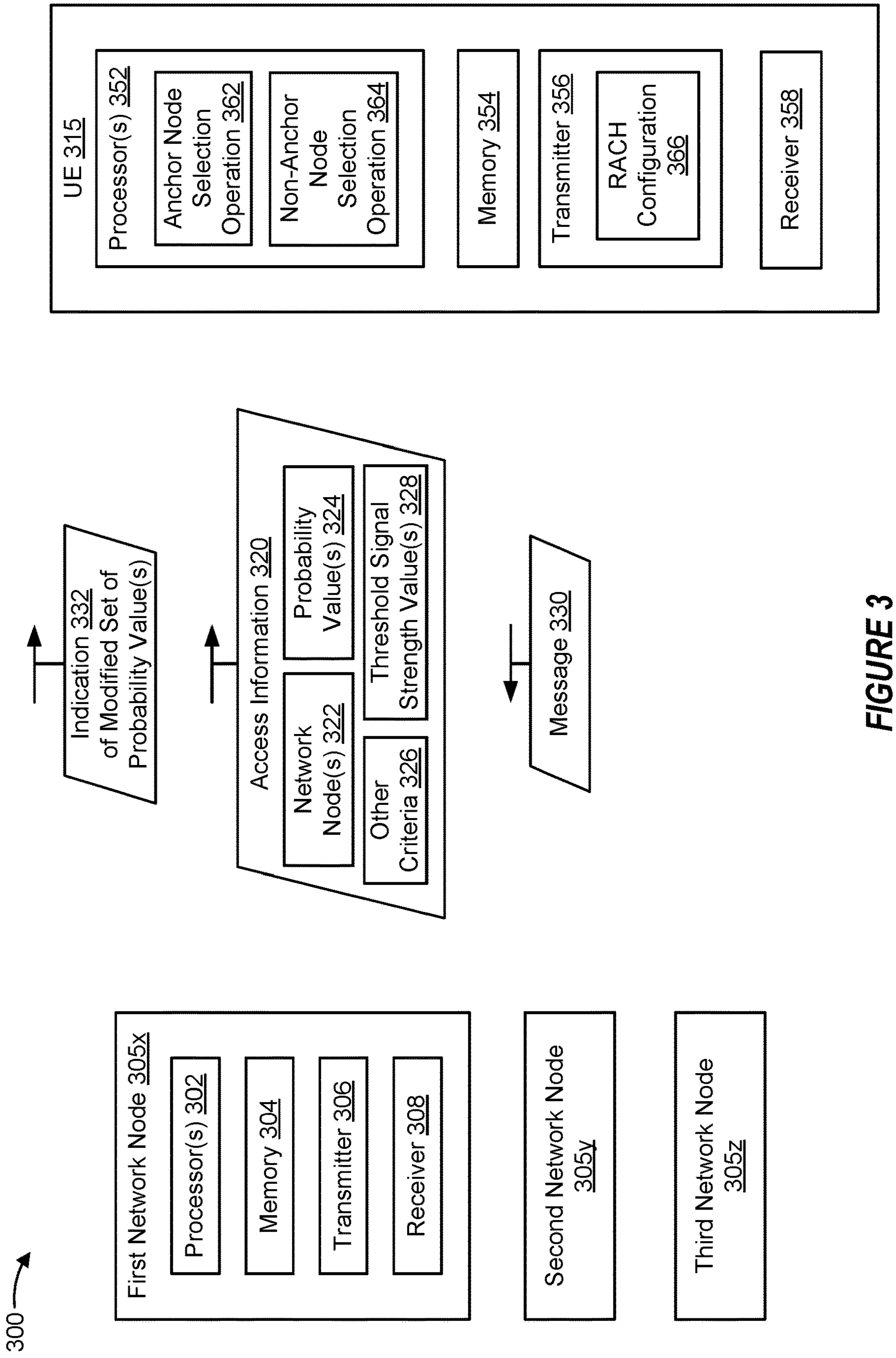
FIG. 3 is a block diagram illustrating an example wireless communication system that supports network node selection by a UE according to one or more aspects.

FIG. 3 is a block diagram illustrating an example wireless communication system 300 that supports network node selection by a UE according to one or more aspects. The wireless communication system 300 may include a UE 315 (such as the UE 115). The wireless communication system 300 may also include one or more network nodes, such as a first network node 305*x*, a second network node 305*y*, and a third network node 305*z* (also referred to herein as network nodes 305*x-z*). An example of a network node may be a base station, such as the base station 105. In some examples, the network nodes 305*x-z* may each include or correspond to a respective base station of the base stations described with reference to FIGS. 1 and 2. Depending on the example, a network node (or network entity) may be implemented as a base station, a network controller, an integrated access and backhauling (IAB) node, a distributed unit (DU), a central unit (CU), or a remote/radio unit (RU) (which may also be referred to as a remote radio unit (RRU)), as illustrative examples. A network node may also be referred to herein as a network entity.

Each of the network nodes 305*x-z* may include one or more processors, one or more memories, a transmitter, and a receiver. To illustrate, the first network node 305*x* may include one or more processors 302 (such as the processor 240), a memory 304 (such as the memory 242), a transmitter 306, and a receiver 308. The one or more processors 302 may be coupled to the memory 304, to the transmitter 306, and to the receiver 308. In some examples, the transmitter 306 and the receiver 308 may include one or more components described with reference to FIG. 2, such as one or more of the modulator/demodulators 232*a-t*, the MIMO detector 236, the receive processor 238, the transmit processor 220, or the TX MIMO processor 230. In some implementations, the transmitter 306 and the receiver 308 may be integrated in one or more transceivers of the first network node 305*x*. Further, each of the second network node and the third network node may include one or more components described with reference to the first network node 305*x*, such as one or more processors corresponding to the one or more processors 302, a memory corresponding to the memory 304, a transmitter corresponding to the transmitter 306, and a receiver corresponding to the receiver 308. In some examples, the one or more processors 302 are individually or collectively operable to perform one or more operations described herein.

The transmitter 306 may be configured to transmit reference signals, synchronization signals, control information, and data to one or more other devices, and the receiver 308 may be configured to receive reference signals, control information, and data from one or more other devices. For example, the transmitter 306 may be configured to transmit signaling, control information, and data to the UE 315, and the receiver 308 may be configured to receive signaling, control information, and data from the UE 315.

The UE 315 may include one or more processors 352 (such as the processor 280), a memory 354 (such as the memory 282), a transmitter 356, and a receiver 358. The one or more processors 352 may be coupled to the memory 354, to the transmitter 356, and to the receiver 358. In some examples, the transmitter 356 and the receiver 358 may include one or more components described with reference to FIG. 2, such as one or more of the modulator/demodulators 254*a-r*, the MIMO detector 256, the receive processor 258, the transmit processor 264, or the TX MIMO processor 266. In some implementations, the transmitter 356 and the receiver 358 may be integrated in one or more transceivers of the UE 315. In some examples, the one or more processors 352 are individually or collectively operable to perform one or more operations described herein.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to one or more of the network nodes 305*x-z*, and the receiver 358 may receive signaling, control information, and data from one or more of the network nodes 305*x-z*.

The wireless communication system 300 may use wireless communication channels, which may be specified by one or more wireless communication protocols, such as a 5G NR wireless communication protocol. To illustrate, one or more of the network nodes 305*x-z* may communicate with the UE 315 using one or more downlink wireless communication channels (such as via one or more of a PDSCH or a PDCCH). The UE 315 may communicate with one or more of the network nodes 305*x-z* using one or more uplink wireless communication channels (such as via one or more of a PUSCH or a PUCCH). Alternatively, or in addition, the UE 315 may communicate with one or more other UEs, such as via a sidelink wireless communication channel.

During an idle or inactive mode operation, the UE 315 may not be engaged in a call or data session and may be ready to receive or initiate calls or data sessions. The UE 315 may monitor for signaling from one or more network nodes, such as one or more of the network nodes 305*x-z*. In some examples, such signaling may include access information 320. For example, the first network node 305*x* may transmit (such as using a broadcast transmission technique or another transmission technique) access information 320 that may be received by one or more UEs, such as the UE 315, one or more other UEs, or a combination thereof. In some examples, the access information 320 includes or corresponds to control signaling that is usable by one or more UEs to determine whether and how to communicate with the first network node 305*x*. For example, the UE 315 may determine whether to camp on the first network node 305*x* in accordance with the access information 320. In some examples, the access information 320 may include a system information block (SIB) associated with the first network node 305*x*, as an illustrative example. One example of a SIB is a system information block of type one (SIB1). Other examples are also within the scope of the disclosure.

In some aspects of the disclosure, the access information 320 may indicate one or more network nodes 322. The access information 320 may further indicate one or more probability values 324 respectively associated with accessing the one or more network nodes 322. In some examples, the one or more network nodes 322 may include or correspond to the network nodes 305*x-z*. To illustrate, the one or more probability values 324 may include a first probability value associated with the first network node 305*x*, a second probability value associated with the second network node 305*y*, and a third probability value associated with the third network node 305*z*. In some other examples, the network node transmitting the access information 320 may be excluded from the one or more network nodes 322. In some such examples, the one or more probability values 324 may exclude the first probability value associated with the first network node 305*x*.

In some examples, the first network node 305*x* (or another network node) may select the one or more probability values 324 in accordance with one or more criteria. In some examples, the one or more criteria may include a determination of whether a quantity of UEs within a coverage area associated with the network nodes 305*x-z* satisfies a threshold. To illustrate, if the quantity of UEs is relatively small, then the quantity of UEs may fail to satisfy the threshold. In such examples, the relatively small number of UEs may be "steered" or "guided" to a relatively small number of network nodes via the one or more probability values 324. As an illustrative example, a probability value associated with the second network node 305*y* may be set to be relatively large (such as 80 percent, 90 percent, 100 percent, or another value), and a probability value associated with the third network node 305*z* may be set to be relatively small (such as 20 percent, 10 percent, zero percent, or another value). In such examples, the third network node 305*z* may operate according to an NES mode with a relatively low probability of being woken by a UE for a data communication. As a result, power consumption may be reduced.

In some other examples, the quantity of UEs within the coverage area may be larger and may satisfy the threshold. In such examples, the UEs may be distributed or allocated among network nodes to improve load balancing within the wireless communication system 300. As an illustrative example, a probability value associated with the second network node 305$y$ and a probability value associated with the third network node 305$z$ may be set equally or similarly, such as 50 percent and 50 percent, 60 percent and 40 percent, or other values. As a result, the probability of one network node being "overwhelmed" with data communications from a relatively large number of UEs may be reduced. By reducing or avoiding such situations in which a relatively large number of UEs select the same node for system access as an anchor or non-anchor node, load balancing may be improved, which may reduce latency and increase throughput in a wireless communication system.

In some examples, the access information 320 may include an identifier associated with each of the one or more network nodes 322. An example of an identifier may include a new radio cell global identity (NCGI) or another type of identifier.

The UE 315 may select, in accordance with the one or more probability values 324, at least one of the one or more network nodes 322 for communication within the wireless communication system 300. To illustrate, the UE 315 may select an anchor node from among the one or more of the network nodes 322 for communication within the wireless communication system 300. Such an operation may include or may be referred to as an anchor node selection operation 362. As referred to herein, an "anchor node" associated with a UE may refer to a network node that transmits access information or that transmits access information that is received or receivable by the UE. For example, the first network node 305$x$ may be an anchor node of the UE 315.

Alternatively, or in addition, to selecting an anchor node, the UE 315 may select, in accordance with the one or more probability values 324, a non-anchor node from among the one or more of the network nodes 322 for communication within the wireless communication system 300. Such an operation may include or may be referred to as a non-anchor node selection operation 364. As referred to herein, a "non-anchor node" associated with a UE may refer to a network node that does not transmit access information or that does not transmit access information that is received or receivable by the UE. In some examples, a non-anchor node may not transmit access information and may not provide active connections with a UE when the UE is in a sleep state. In some examples, a UE may not camp on a non-anchor node that has entered a sleep state. In some implementations, during operation according to a sleep state, a non-anchor node may still monitor for messages (such as RACH messages) from one or more UEs to access the network. In some examples, a non-anchor node may at least partly wake up from such a sleep mode (such as during configured RACH intervals) to monitor for messages from one or more UEs to access the network. For example, if the second network node 305$y$ does not transmit access information, or does not transmit access information that is received or receivable by the UE 315, then the second network node 305$y$ may be a non-anchor node of the UE 315. As another example, if the third network node 305$z$ does not transmit access information, or does not transmit access information that is received or receivable by the UE 315, then the third network node 305$z$ may be a non-anchor node of the UE 315. A non-anchor node may also operate according to a sleep state. The sleep state may be a network energy saving (NES) mode and may be referred to as an NES node.

In some examples, the access information 320 may indicate one or more of an anchor status or non-anchor status associated with each network node of the one or more network nodes 322. For example, the access information 320 may indicate, for each network node of the one or more network nodes 322, whether the network node is eligible to serve as one or both of an anchor node or a non-anchor node. In some examples, the UE 315 may determine whether to camp on a first network node based on the indication of the anchor status. For example, the UE 315 may determine whether to camp on a network node that is eligible to serve as an anchor node.

The UE 315 may randomly or pseudo-randomly select a network node of the one or more network nodes 322 for network access based on the one or more probability values 324. The selected network node may include an anchor node or non-anchor node of the one or more of the network nodes 305$x$-$z$. Selecting such an anchor node or non-anchor node may include randomly or pseudo-randomly selecting the anchor node or non-anchor node from among the one or more network nodes 322 in accordance with the one or more probability values 324. In such examples, the UE 315 may select an anchor node or non-anchor node for accessing the network that may be the same or that may be different from a node on which the UE 315 is currently camped.

To illustrate, in one example, the one or more network nodes 322 include multiple network nodes, such as the second network node 305$y$ and the third network node 3052, and the one or more probability values 324 may indicate that the second network node 305$y$ and the third network node 305$z$ are each associated with a probability of fifty percent. In such examples, the UE 315 may select the second network node 305$y$ with a probability of fifty percent and may select the third network node 305$z$ with a probability of fifty percent. Further, in such examples, a first probability value of the one or more probability values 324 associated with the second network node 305$y$ may be the same as a second probability value of the one or more probability values 324 associated with the third network node 305$z$ (such as if the first probability value and the second probability value are both fifty percent). In another illustrative example, the one or more probability values 324 may indicate that the second network node 305$y$ is associated with a probability of eighty percent and that the third network node 305$z$ is associated with a probability of twenty percent. In such examples, the UE 315 may select the second network node 305$y$ with a probability of eighty percent and may select the third network node 305$z$ with a probability of twenty percent. Further, in such examples, a first probability value of the one or more probability values 324 associated with the second network node 305$y$ (such as a probability value of eighty percent) may be different than a second probability value of the one or more probability values 324 associated with the third network node 305$z$ (such as a probability value of twenty percent).

In these illustrative examples, a sum of the one or more probability values may be equal to one hundred percent. In some other examples, the sum of the one or more probability values may be less than one hundred percent. For example, the one or more probability values 324 may indicate that the second network node 305$y$ is associated with a probability of twenty-five percent and that the third network node 305$z$ is associated with a probability of twenty-five percent. In such examples, the UE 315 may select the second network node 305$y$ with a probability of twenty-five percent, may select the third network node 305$z$ with a probability of twenty-five percent, and may select none of the one or more network nodes 322 with a probability of fifty percent. Further, in some cases, a network node may be associated with a probability value of zero, which may indicate, for example, that the network node is in a sleep mode of operation or that the network node is not accepting new connections.

After performing one or more of the anchor node selection operation 362 to select an anchor node or the non-anchor node selection operation 364 to select a non-anchor node, the UE 315 may communicate with, or may initiate communication with, one or more of the anchor node or the non-anchor node. To illustrate, after selecting the second network node 305*y* in accordance with the one or more probability values 324 (such as by selecting the second network node 305*y* instead of selecting the third network node 305*z*), the UE 315 may transmit a message 330 to the second network node 305*y*. In some examples, the message 330 may be associated with a random access channel (RACH) procedure and may include a RACH preamble associated with the RACH procedure. In some examples, the UE 315 may receive a RACH configuration 366 associated with the second network node 305*y* and may transmit the message 330 in accordance with the RACH configuration 366. In some examples, after completing the RACH procedure that may be associated with the message 330, the UE 315 may establish another connection with the second network node 305*y*, such as a radio resource control (RRC) connection.

In some examples, the RACH configuration 366 is in accordance with a coverage area that is associated with the second network node 305*y*. Some examples of coverage areas are described further with reference to FIG. 7.

In some implementations, the access information 320 may include a SIB1 associated with the first network node 305*x* that includes a probability vector indicating the one or more probability values 324. In some other implementations, the access information 320 may include, for each network node of the one or more network nodes 322, a respective SIB1 associated with the network node that includes a probability value of the one or more probability values 324 associated with the network node. Some examples of such implementations are described further with reference to FIG. 5.

In some implementations, the one or more probability values 324 may be modified or subject to modification. For example, the wireless communication system 300 may operate in accordance with a wireless communication protocol that specifies one or more conditions associated with modification of the one or more probability values 324. In some examples, the wireless communication protocol may specify a time period during which the one or more probability values 324 are eligible for modification. The time period may correspond to a system information (SI) modification time period, as an illustrative example. In some such examples, the UE 315 may receive, from the first network node 305*x* and during an SI modification time period, an indication 332 of a modified set of the one or more probability values 324. For example, the indication 332 may include a modification of at least one probability value of the one or more probability values 324, or the indication may include another set of probability values to replace the one or more probability values 324. In some examples, the wireless communication protocol may specify that the UE 315 is to receive a recent broadcast of system information prior to attempting to establish a radio resource control (RRC) connection to one or more of an anchor node or a non-anchor node.

Alternatively or in addition, the wireless communication protocol may specify that one or more conditions for when a UE may "ignore" probability values, such as the one or more probability values 324. For example, the wireless communication protocol may specify that a UE operating according to a connected mode (such as an RRC connected mode) are to ignore the one or more probability values (such as by selecting a network node of the one or more network nodes 322 irrespective of the one or more probability values 324). To further illustrate, the UE 315 may transmit the message 330 during operation according to a connected mode with the second network node 305*y*, and the UE 315 may maintain the connected mode with the second network node 305*y* irrespective of receiving additional access information indicating one or more additional probability values (such as by "ignoring" the additional probability values).

In some examples, probability values may be communicated via different messaging techniques for anchor nodes and non-anchor nodes. To illustrate, in some examples, the UE 315 may receive the access information 320 (or at least a portion of the access information 320, such as a probability value) via broadcast, groupcast, or multicast messaging, and the second network node 305*y* may be an anchor node associated with the UE 315. In some other examples, the UE 315 may receive the access information 320 (or at least a portion of the access information 320, such as a probability value) via unicast messaging, and the second network node 305*y* may be a non-anchor node associated with the UE 315. In some aspects, a probability associated with accessing an anchor node may be modified less frequently than a probability associated with accessing a non-anchor node. As a result, the unicast messaging may enable more dynamic modification of a probability associated with a non-anchor node as compared to the broadcast, groupcast, or multicast messaging.

Alternatively, or in addition, to using the one or more probability values 324, in some aspects, the UE 315 may select a network node in accordance with one or more other criteria 326. In some examples, the one or more other criteria 326 is included in access information (such as the access information 320), system information (SI) signaling, or other signaling. In some examples, the one or more other criteria 326 may indicate a device type (such as repeater nodes, integrated access and backhaul (IAB) nodes, or non-public network (NPN) nodes) that may be eligible or ineligible to connect to anchor nodes, eligible or ineligible to connect to non-anchor nodes, or both.

To further illustrate, in some examples, the device type may indicate, for each network node of the one or more network nodes 322, a UE type, and the one or more probability values 324 may be associated with the UE type. In some such examples, the one or more other criteria 326 may indicate that the UE 315 is eligible (or ineligible) to connect to the one or more network nodes 322 (subject to the one or more probability values 324) if a UE type of the UE 315 corresponds to the UE type indicated by the one or more other criteria 326. The UE 315 may perform one or both of the anchor node selection operation 362 or the non-anchor node selection operation 364 in accordance with the UE type.

In an illustrative example, the UE type may indicate whether a UE is eligible to communicate with the second network node 305*y*. In such examples, the UE type may indicate one or more of a first UE type that is eligible to communicate with the second network node 305*y* or a second UE type that is ineligible to communicate with the third network node 305*z*. In such examples, the UE 315 may select the second network node 305*y* instead of the third network node 305*z* for transmission of the message 330 in accordance with the UE 315 being associated with one or more of the first UE type or the second UE type.

In another example, the one or more other criteria 326 may indicate one or more quality of service (QoS) metrics. For example, the one or more other criteria 326 may include a respective QoS metric for each of the one or more network nodes 322, and the UE 315 may perform one or both of the anchor node selection operation 362 or the non-anchor node selection operation 364 in accordance with the QoS metrics. To further illustrate, in some examples, the UE 315 may receive an indication of a QoS metric associated with at least one of the one or more network nodes 322 and may transmit the message 330 in accordance with the QoS metric.

In another example, the one or more other criteria 326 may indicate whether the one or more probability values 324 are associated with anchor nodes or with non-anchor nodes. For example, the one or more probability values 324 may be associated with one of a set of anchor nodes or a set of non-anchor nodes, and the access information 320 may further include another set of probability values associated with the other of the set of anchor nodes or the set of non-anchor nodes.

In another example, the access information 320 may indicate one or more threshold signal strength values 328 that may be associated with the one or more network nodes 322. The UE 315 may transmit the message 330 in accordance with the one or more threshold signal strength values 328. For example, the UE 315 may select the second network node 305*y* for the transmission of the message 330 in accordance with a determination that a received signal strength associated with the second network node 305*y* satisfies a threshold signal strength value of the one or more threshold signal strength values 328 that is associated with the second network node 305*y*.

In some implementations, the one or more threshold signal strength values 328 may map to the one or more probability values 324. For example, each threshold signal strength value may also correspond to and indicate a respective probability value of the one or more probability values 324. In some examples, the UE 315 may store a lookup table indicating a mapping of threshold signal strength values to probability values. In such examples, the one or more probability values 324 may be indicated in accordance with the one or more threshold signal strength values 328 (or vice versa). Some illustrative examples that may be associated with the one or more threshold signal strength values 328 are described further with reference to FIG. 7.

In some implementations, one or more network nodes of the wireless communication system 300 may operate according to multiple modes. The multiple modes may include a first mode (such as a "sleep" mode) associated with a first power consumption and a second mode (such as an "active" mode) associated with a second power consumption that is greater than the first power consumption. A network node may periodically wake from the first mode and enter the second mode to monitor for one or more communications, such as the message 330. In some implementations, the first mode may correspond to a network energy saving (NES) mode. Some illustrative examples of the multiple modes are described further with reference to FIG. 11.

In some examples, to avoid waking a non-anchor node (and increasing power consumption associated with the non-anchor node), the UE 315 may attempt to transmit the message 330 to an anchor node prior to transmitting the message 330 to the non-anchor node. To illustrate, the first network node 305*x* may correspond to an anchor node associated with the UE 315, and the second network node 305*y* may correspond to a non-anchor node associated with the UE 315. The UE 315 may initiate a threshold quantity of first RACH procedures with the first network node 305*x*. For example, the UE 315 may perform a threshold quantity of transmissions of a message of type one (msg1) to attempt to initiate the first RACH procedures. If the UE 315 fails to receive a response to the transmissions of the msg1, the UE 315 may detect a RACH failure associated with the threshold quantity of first RACH procedures. The UE 315 may initiate a second RACH procedure with the second network node 305*y* (such as in accordance with detecting the RACH failure associated with the threshold quantity of the first RACH procedures). In some examples, the UE 315 may transmit the message 330 in connection with the second RACH procedure.

Other examples are also within the scope of the disclosure. For example, in some implementations, the UE 315 may initiate a threshold quantity of first RACH procedures with a non-anchor node. The UE 315 may initiate a second RACH procedure with an anchor node in accordance with detecting a RACH failure associated with the threshold quantity of first RACH procedures. In some examples, the anchor node may correspond to the first network node 305*x*, and the non-anchor node may correspond to the second network node 305*y*.

Figure 4:
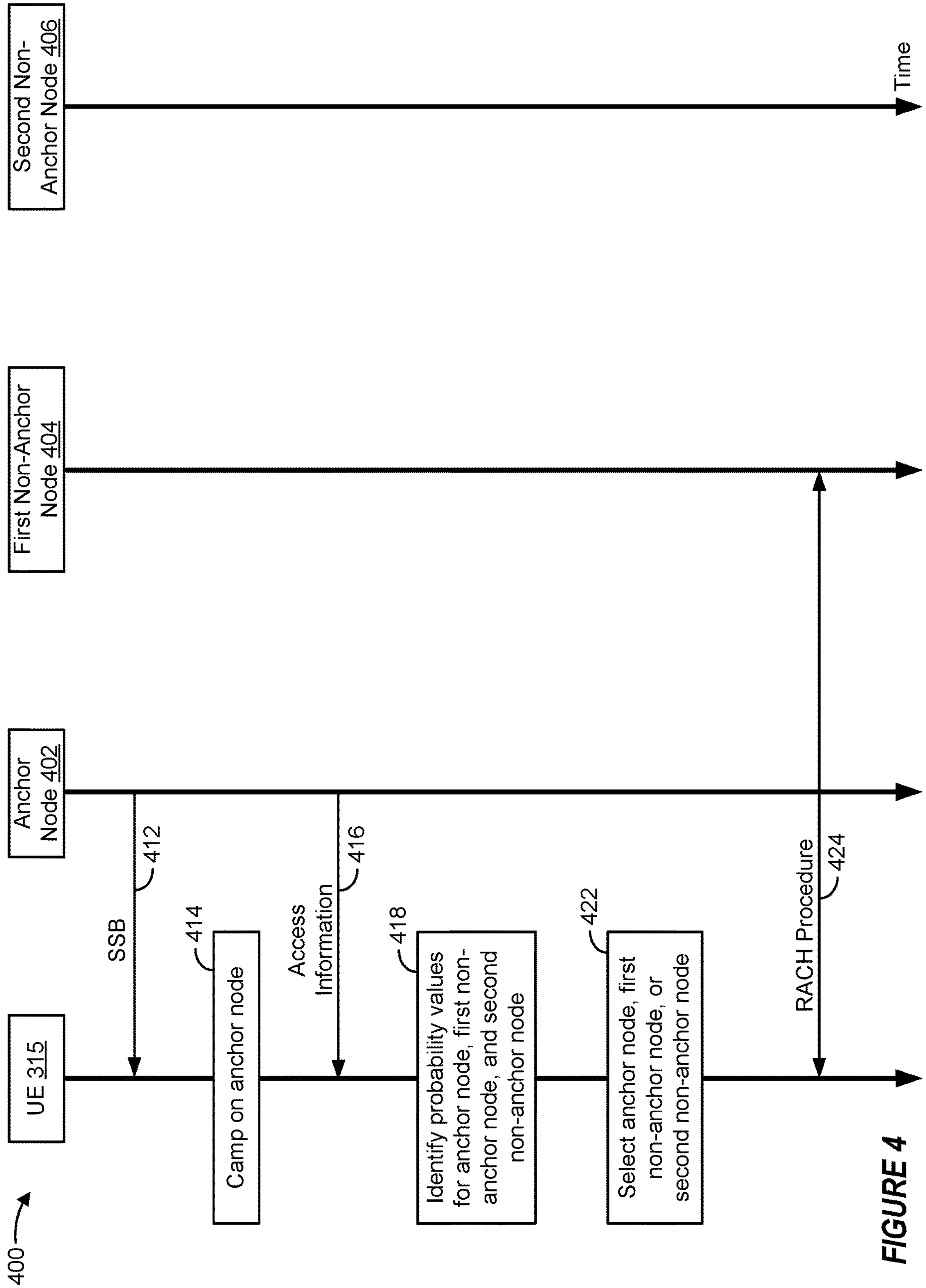
FIG. 4 is a diagram illustrating example operations that support network node selection by a UE according to one or more aspects.

FIG. 4 is a diagram illustrating example operations 400 that support network node selection by a UE according to one or more aspects. In FIG. 4, the operations 400 may be described with reference to the UE 315, an anchor node 402 that may be associated with the UE 315, a first non-anchor node 404 that may be associated with the UE 315, and a second non-anchor node 406 that may be associated with the UE 315. In some examples, the anchor node 402, the first non-anchor node 404, and the second non-anchor node 406 may correspond to first network node 305*x*, the second network node 305*y*, and the third network node 305*z*, respectively. Other examples are also within the scope of the disclosure.

The operations 400 may include transmitting a synchronization signal block (SSB), at 412. The anchor node 402 may transmit the SSB, and one or more UEs may receive the SSB. For example, the UE 315 may receive the SSB.

The operations 400 may further include camping on an anchor node, at 414. For example, the UE 315 may camp on the anchor node 402 in accordance with receiving the SSB (at 412).

The operations 400 may further include transmitting access information, at 416. For example, the anchor node 402 may transmit the access information, and one or more UEs (such as the UE 315) may receive the access information. In some examples, the access information is the access information 320 of FIG. 3.

The operations 400 may further include identifying probability values for each of the anchor node 402, the first non-anchor node 404, and the second non-anchor node 406, at 418. For example, the UE 315 may identify the one or more probability values 324 from the access information 320 of FIG. 3. In such examples, the one or more probability values 324 may include, for example, a first probability value associated with the anchor node 402, a second probability value associated with the first non-anchor node 404, and a third probability value associated with the second non-anchor node 406. Other examples are also within the scope of the disclosure.

The operations 400 may further include performing, in accordance with the probability values, a selection among the anchor node 402, the first non-anchor node 404, and the second non-anchor node 406, at 422. For example, the UE 315 may randomly or pseudo-randomly select one of the anchor node 402, the first non-anchor node 404, and the second non-anchor node 406 in accordance with the probability values. In the example of FIG. 4, the UE 315 may select the first non-anchor node 404. Accordingly, the example of FIG. 4 may correspond to the non-anchor node selection operation 364 of FIG. 3. Other examples are also within the scope of the disclosure.

The operations 400 may further include performing a RACH procedure with the first non-anchor node 404, at 424. In some examples, the RACH procedure is associated with the message 330 of FIG. 3. In some examples, the UE 315 may establish an RRC connection with first non-anchor node 404 after completing the RACH procedure. In some other examples, the UE 315 may not complete the RACH procedure. To illustrate, in some examples, the UE 315 may receive a message that includes a RACH redirection instruction redirecting the RACH procedure to another network node. An example of a message including a RACH redirection instruction is described further with reference to FIG. 8.

Figure 5:
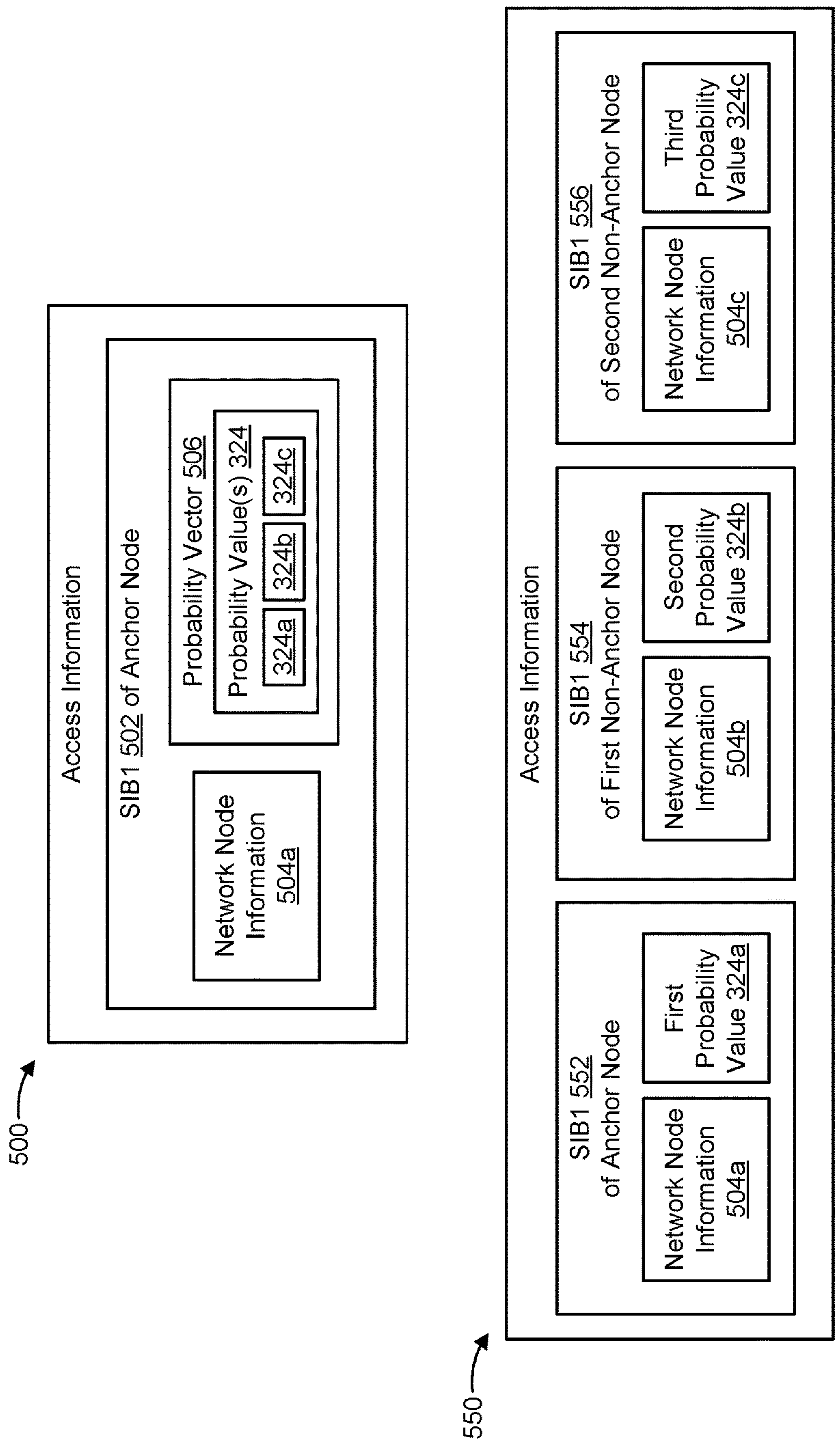
FIG. 5 is a diagram illustrating example access information supporting network node selection by a UE according to one or more aspects.

FIG. 5 is a diagram illustrating example access information supporting network node selection by a UE according to one or more aspects. FIG. 5 illustrates a first example of access information 500 of an anchor node. In some implementations, the anchor node may correspond to the first network node 305*x* or the anchor node 402, and the access information 500 may correspond to the access information 320 or the access information transmitted described with reference to FIG. 4.

The access information 500 may include a SIB1 502 associated with the anchor node including network node information 504*a*. For example, the network node information 504*a* may include one or more of cell access related information (such as a cell identifier (ID)) associated with the anchor node, a common RACH configuration (such as a RACH configuration that is common to the anchor node, the first non-anchor node, and the second non-anchor node), system information (SI) (such as scheduling information) associated with the anchor node, or bandwidth part (BWP) information indicating one or more BWPs associated with the anchor node.

The SIB1 502 may further include a probability vector 506. The probability vector 506 may include the one or more probability values 324. In the example of FIG. 5, the one or more probability values 324 may include a first probability value 324*a* associated with the anchor node, a second probability value 324*b* associated with the first non-anchor node, a third probability value 324*c* associated with the second non-anchor node.

FIG. 5 also illustrates a second example of access information 550. The access information 550 may include a SIB1 552 of the anchor node, a SIB1 554 of a first non-anchor node, and a SIB1 556 of a second non-anchor node. In some examples, the anchor node may correspond to the first network node 305*x* or the anchor node 402, the second anchor node may correspond to the second network node 305*y* or the first non-anchor node 404, and the second non-anchor node may correspond to the third network node 305*z* or the second non-anchor node 406. The access information 550 may correspond to the access information 320 or the access information transmitted described with reference to FIG. 4.

The SIB1 552 may include the network node information 504*a* and the first probability value 324*a*. The SIB1 554 may include network node information 504*b* associated with the first non-anchor node and may further include the second probability value 324*b*. The SIB1 556 may include network node information 504*c* associated with the second non-anchor node and may further include the third probability value 324*c*.

Accordingly, in some implementations, probability values associated with different network nodes may be indicated by "aggregating" the probability values within a SIB1, such as the SIB1 502 of the access information 500. In some other implementations, probability values associated with different network nodes may be indicated by "piggybacking" different SIB1s within access information, such as described with reference to the access information 550. In such examples, the anchor node may "collect" SIB Is associated with one or more other nodes (such as the SIB1s 554, 556) and may "piggyback" such SIB1s to the SIB1 552.

Although certain examples may be described with reference to a SIB1, other examples are also within the scope of the disclosure. For example, in some other implementations, SIBs of other types can be used (alternatively or in addition to a SIB1).

Figure 6:
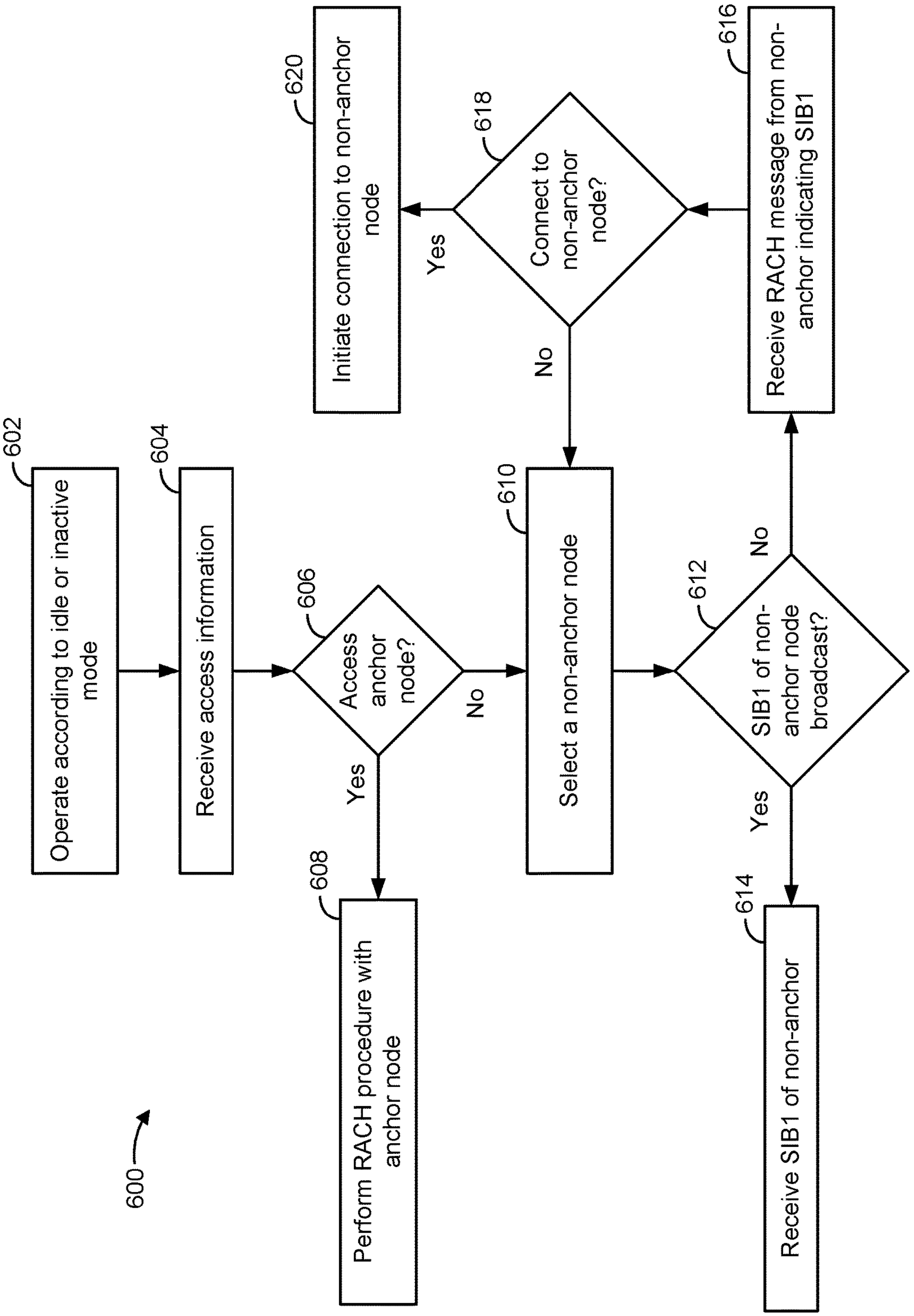
FIG. 6 is a diagram illustrating an example method that supports network node selection by a UE according to one or more aspects.

FIG. 6 is a diagram illustrating an example method 600 that supports network node selection by a UE according to one or more aspects. In some examples, the method 600 is performed by a UE, such as the UE 315.

The method 600 may include operating according to an idle or inactive mode, at 602. For example, the UE 315 may operate according to the idle or inactive mode.

The method 600 may further include receiving access information, at 604. For example, the UE 315 may receive the access information 320, the access information 500, or the access information 550.

The method 600 may further include determining whether to access an anchor node, at 606. For example, in some implementations, the UE 315 may "default" to a non-anchor node (instead of an anchor node) for a RACH procedure and may "fall back" to an anchor node for the RACH procedure if the UE 315 is unable to communicate with (or establish a connection with) the non-anchor node. The method 600 may include performing a RACH procedure with the anchor node, at 608.

To further illustrate, in some implementations, the UE 315 may initiate a threshold quantity of first RACH procedures with a second network node (such as the second network node 305*y* or the first non-anchor node 404). In accordance with the threshold quantity of first RACH procedures with the second network node, the UE 315 may initiate a second RACH procedure with a first network node (such as the first network node 305*x* or the anchor node 402) or to a third network node (such as the third network node 3052).

In some other examples, the UE 315 may select a non-anchor node, at 610. For example, the UE 315 may select, as the non-anchor node, one of the second network node 305*y*, the third network node 305*z*, the first non-anchor node 404, or the second non-anchor node 406.

The method 600 may further include determining whether a SIB1 associated with the non-anchor node is received via a broadcast technique, at 612. If so, the method 600 may include receiving the SIB1, at 614. In some other examples, the method 600 may include receiving a RACH message from the non-anchor node indicating the SIB1. The RACH message may include a message of type one (msg1) or a message of type three (msg3) of a "four-step" RACH procedure, as illustrative examples.

The method 600 may further include determining whether to connect to the non-anchor node, at 618. For example, the UE 315 may determine, in accordance with the SIB1, whether the UE 315 is to connect to the non-anchor node associated with the SIB1. If so, the method 600 may include initiating a connection (such as a radio resource control (RRC) connection) to the non-anchor node, at 620. In some other examples, the method 600 may include selecting another non-anchor node, at 610.

One or more features described herein may improve performance within a wireless communication system, such as by reducing power consumption within the wireless communication system 300. For example, if a relatively small number of UEs are to perform data communications, the UEs may be "steered" or "guided" to a relatively small number of network nodes via the one or more probability values 324. As an illustrative example, a probability value associated with the second network node 305*y* may be set to be relatively large (such as 80 percent, 90 percent, 100 percent, or another value), and a probability value associated with the third network node 305*z* may be set to be relatively small (such as 20 percent, 10 percent, zero percent, or another value). In such examples, the third network node 305*z* may operate according to an NES mode with a relatively low probability of being woken by a UE for a data communication. As a result, power consumption may be reduced.

Alternatively, or in addition, one or more implementations may reduce latency and may increase throughput in a wireless communication system. For example, use of the one or more probability values 324 may reduce or avoid situations in which a relatively large number of UEs select the same network node as an anchor node or as a non-anchor node. As an illustrative example, a probability value associated with the second network node 305*y* and a probability value associated with the third network node 305*z* may be set equally or similarly, such as 50 percent and 50 percent, 60 percent and 40 percent, or other values. As a result, the probability of one network node being "overwhelmed" with a relatively large number of UEs initiating data communications may be reduced. By reducing or avoiding such situations in which a relatively large number of UEs select the same node (such by selecting the same node as an anchor or non-anchor node), load balancing may be improved, which may reduce latency and increase throughput in a wireless communication system.

As another example, use of device criteria or QoS metrics may enable UE devices to be "matched" to network nodes in accordance with UE capabilities, network node capabilities, or other parameters. By "matching" the UE devices and network devices in such a manner, resource allocation may be improved in a wireless communication system, such as by guiding UEs associated with a particular capability to a network node that supports the particular capability.

Figure 7:
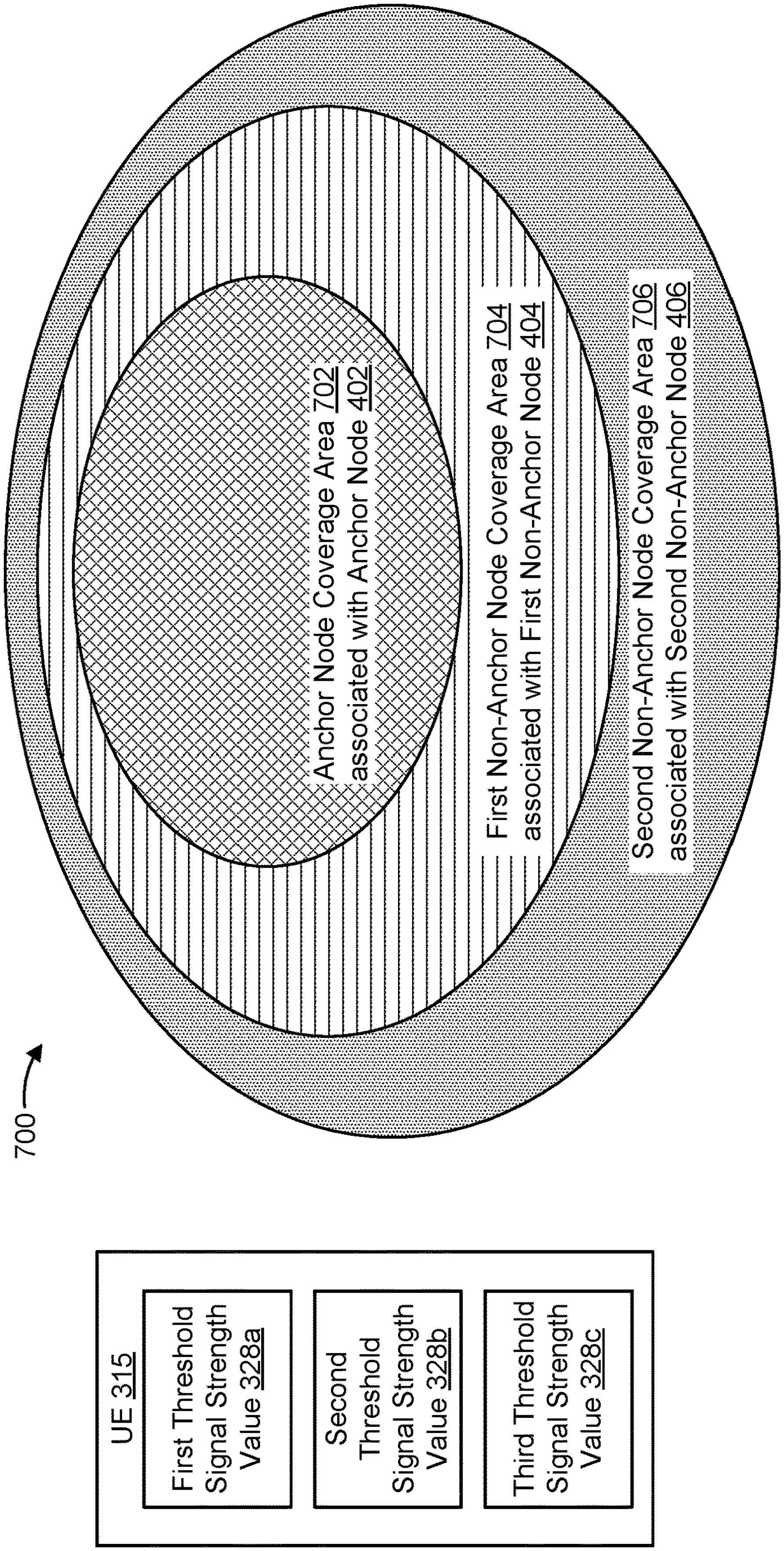
FIG. 7 is a diagram illustrating an example colocation scheme that supports network node selection by a UE according to one or more aspects.

FIG. 7 is a diagram illustrating an example colocation scheme 700 that supports network node selection by a UE according to one or more aspects. The colocation scheme 700 may be associated with an anchor node coverage area 702, a first non-anchor node coverage area 704, and a second non-anchor node coverage area 706. In some examples, the anchor node coverage area 702, the first non-anchor node coverage area 704, and the second non-anchor node coverage area 706 may be respectively associated with the anchor node 402, the first non-anchor node 404, and the second non-anchor node 406. In some examples, the anchor node coverage area 702 may be co-located within the first non-anchor node coverage area 704, and the first non-anchor node coverage area 704 may be co-located within the second non-anchor node coverage area 706. In some examples, the coverage areas 702, 704, and 706 may correspond to cell radii.

The coverage areas of the colocation scheme 700 may be associated with respective threshold signal strength values. For example, the anchor node coverage area 702, the first non-anchor node coverage area 704, and the second non-anchor node coverage area 706 may be respectively associated with a first threshold signal strength value 328*a*, a second threshold signal strength value 328*b*, and a third threshold signal strength value 328*c*, respectively. In some examples, the threshold signal strength values 328*a*, 328*b*, and 328*c* may be included in the one or more threshold signal strength values 328 of FIG. 3. In some examples, the threshold signal strength values 328*a*, 328*b*, and 328*c* may correspond to reference signal received power (RSRP) values, received signal strength indicator (RSSI) values, or reference signal received quality (RSRQ) values, as illustrative examples.

The UE 315 may select one or more network nodes in accordance with the colocation scheme 700, such as by performing one or both of the anchor node selection operation 362 or the non-anchor node selection operation 364 in accordance with the colocation scheme 700. For example, the UE 315 may select a network node for the transmission of the message 330 in accordance with the colocation scheme 700. In some implementations, the threshold signal strength values 328*a*, 328*b*, and 328*c* may be associated with a priority scheme in which the UE 315 may prioritize connecting to the network node with the greatest coverage area and may "fall back" if a received signal strength value measured by the UE for the network node exceeds the threshold signal strength value associated with the network node. If the received signal strength value for the network node fails to exceed the threshold signal strength value associated with the network node, the UE may "fall back" to another network node that is associated with less coverage area and a measured signal strength value that exceeds the threshold signal strength value associated with the other network node.

To further illustrate, Table 1 illustrates an example of information that may be indicated to the UE 315, such as via the access information 320 of FIG. 3. In the example of Table 1, T0, T1, and T2 may indicate the first threshold signal strength value 328*a*, the second threshold signal strength value 328*b*, and the third threshold signal strength value 328*c*, respectively, and Qrx may indicate a received signal strength value measured by the UE 315. In some examples, the UE 315 may measure the received signal strength value Qrx using an SSB received from the anchor node 402. In some other examples, the UE 315 receive the SSB from a non-anchor node, such as the first non-anchor node 404 or the second non-anchor node 406.

TABLE 1

| Measurement Condition | Result |
|---|---|
| $Qrx \leq T0$ | Idle mode |
| $T0 < Qrx \leq T1$ | Select anchor node |
| $T1 < Qrx \leq T2$ | Select first non-anchor node |
| $T2 \leq Qrx$ | Select second non-anchor node |

In the example of Table 1, the UE 315 may "prefer" to communicate with the second non-anchor node 406, which may be associated with the largest coverage area, as illustrated in the example of FIG. 7. As a result, if the received signal strength value Qrx satisfies the third threshold signal strength value 328*c*, the UE 315 may select the second non-anchor node 406. Alternatively, in some other examples, the UE 315 may select the first non-anchor node 404 or the anchor node 402, or may enter an idle mode of operation, as indicated in Table 1.

Some such examples may be performed in accordance with a conditional handover (CHO) of the UE 315 from one network node associated with the colocation scheme 700 to another network node associated with the colocation scheme 700. To further illustrate, the UE 315 may transmit the message 330 in accordance with a CHO from the first network node 305*x* to the second network node 305*y* and further in accordance with the one or more threshold signal strength values 328. In some circumstances, the UE 315 may reselect among network nodes (such as via a CHO or via another operation) while operating according to a connected or idle mode.

In some examples, the RACH configuration 366 of FIG. 3 may be selected to achieve a particular coverage area illustrated in FIG. 7. For example, if the RACH configuration 366 is associated with the second non-anchor node coverage area 706, the RACH configuration 366 may be selected to accommodate a greater distance from the UE 315 and the second non-anchor node 406 than if the RACH configuration 366 is associated with the anchor node 402.

Although the example of FIG. 7 may illustrate an example of co-located coverage areas, other examples are also within the scope of the disclosure. For example, in some implementations, two or more coverage areas may be overlapping (but not co-located) or non-overlapping with one another. As another example, other colocation schemes may include more than, or fewer than, three network nodes.

It is noted that one or more examples of FIG. 7 may be implemented alternatively to, or in addition to, one or more other examples described herein. For example, one or more examples of FIG. 7 may be implemented alternatively to, or in addition to, using the one or more probability values 324. In one example, the UE 315 may select a node in accordance with the one or more probability values 324 conditioned on a determination that a received signal strength of a signal received from the node satisfies a corresponding threshold signal strength value of the one or more threshold signal strength values 328.

One or more features described with reference to FIG. 7 may improve performance within a wireless communication system. To illustrate, if the second non-anchor node 406 of FIG. 7 is associated with a greater coverage area than the first non-anchor node 404 and the anchor node 402, then selection of the second non-anchor node 406 may improve performance, such as by avoiding a handoff from the anchor node 402 or the first non-anchor node 404 to the second non-anchor node 406 in some circumstances (such as by enabling the UE to connect directly to the second non-anchor node 406). As a result, by reducing or avoiding one or more handoffs, power consumption may be reduced and service continuity may be improved in some circumstances.

Figure 8:
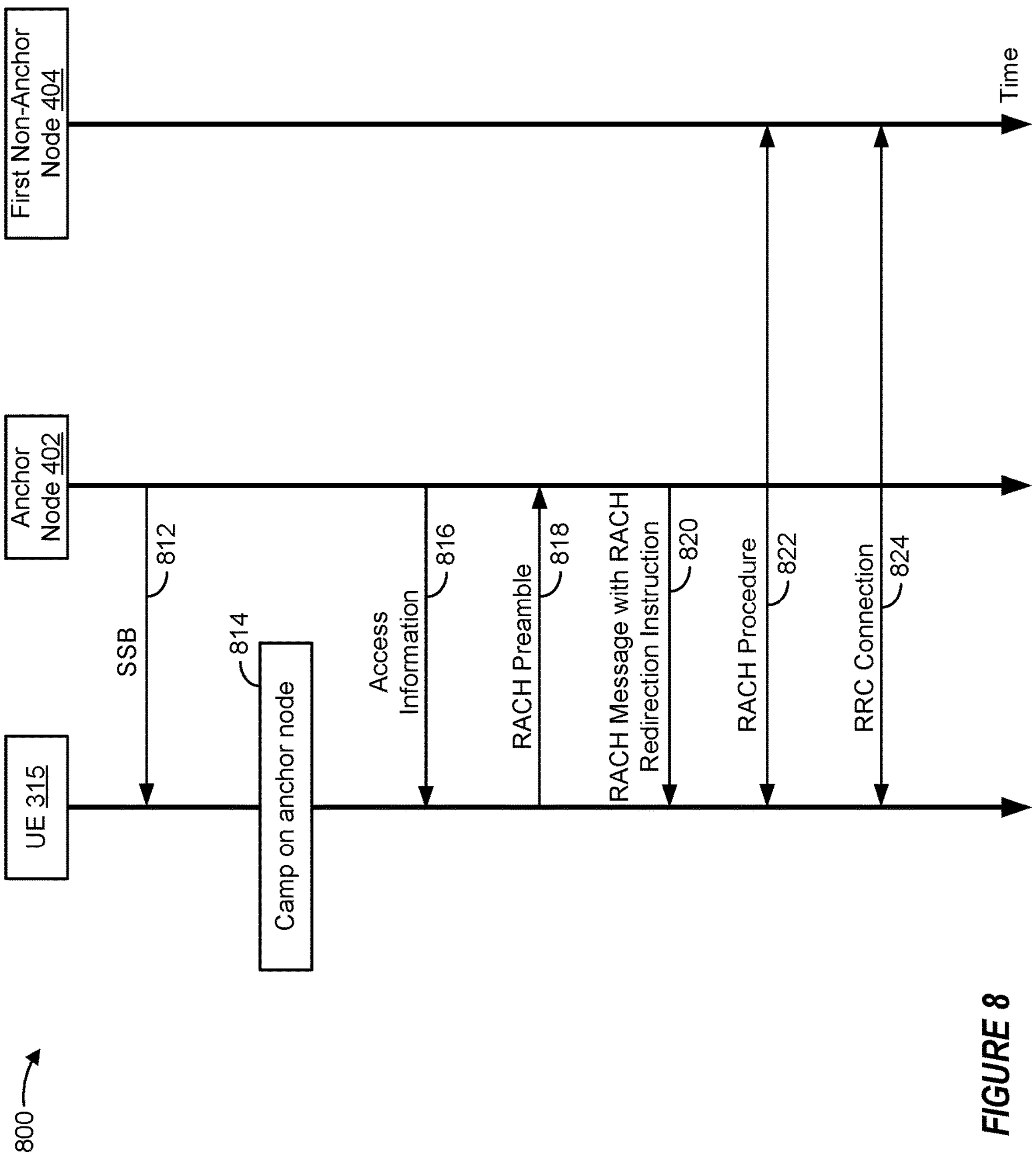
FIG. 8 is a diagram illustrating example operations that support network node selection by a UE according to one or more aspects.

FIG. 8 is a diagram illustrating example operations 800 that support network node selection by a UE according to one or more aspects. In FIG. 8, the operations 800 may be described with reference to the UE 315, the anchor node 402, and the first non-anchor node 404. Other examples are also within the scope of the disclosure.

The operations 800 may include transmitting an SSB, at 812. The anchor node 402 may transmit the SSB, and one or more UEs may receive the SSB. For example, the UE 315 may receive the SSB.

The operations 800 may further include camping on an anchor node, at 814. For example, the UE 315 may camp on the anchor node 402 in accordance with receiving the SSB (at 412).

The operations 800 may further include transmitting access information, at 816. For example, the anchor node 402 may transmit the access information, and one or more UEs (such as the UE 315) may receive the access information. In some examples, the access information is the access information 320 of FIG. 3.

The operations 800 may further include transmitting a RACH preamble to the anchor node 402, at 818. For example, the RACH preamble may be a message of type one (msg1) associated with a RACH procedure. In some examples, the UE 315 may transmit the RACH preamble as the message 330 of FIG. 3. To illustrate, the UE 315 may complete the RACH procedure with the anchor node 402 and may establish another connection (such as an RRC connection) with the anchor node after completing the RACH procedure.

In some other examples, the UE 315 may not complete the RACH procedure with the anchor node 402. For example, the anchor node 402 may provide, at 820, a RACH message to the UE 315 including a RACH redirection instruction. In some examples, the RACH redirection instruction may indicate a non-anchor node, such as the first non-anchor node 404. In some examples, the anchor node 402 may provide the RACH redirection instruction to improve network load distribution, as an illustrative example. The RACH message may correspond to a message of type two (msg2) associated with a RACH procedure or a message of type four (msg4) associated with the RACH procedure, as illustrative examples.

In accordance with the RACH redirection instruction, the operations 800 may further include performing a RACH procedure with the first non-anchor node 404, at 822. In some examples, performing the RACH procedure may include performing the transmission of the message 330 of FIG. 3 in accordance with the RACH redirection instruction.

The operations 800 may further include establishing another connection with the first non-anchor node 404, at 824. For example, the UE 315 may establish an RRC connection with the first non-anchor node 404.

Figure 9:
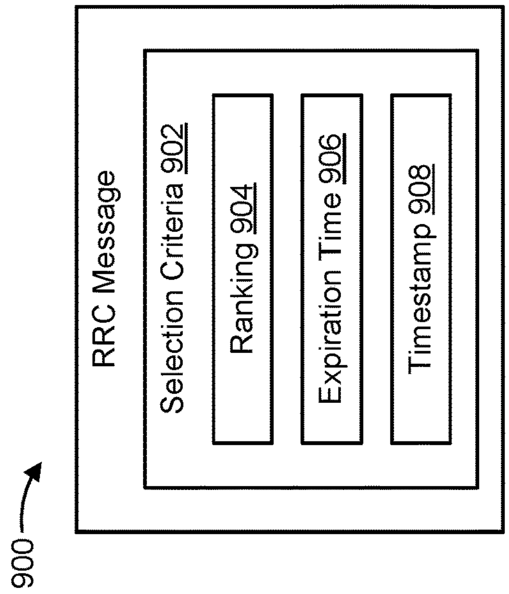
FIG. 9 is a diagram illustrating an example RRC message that supports network node selection by a UE according to one or more aspects.

FIG. 9 is a diagram illustrating an example RRC message 900 that supports network node selection by a UE according to one or more aspects. In some examples, the RRC message 900 is one of an RRC release message, an RRC suspend configuration message, or a paging message. In some examples, a network node may transmit the RRC message 900. For example, the RRC message 900 may be transmitted by any of the first network node 305*x*, the second network node 305*y*, the third network node 305*z*, the anchor node 402, the first non-anchor node 404, or the second non-anchor node 406.

In some cases, after establishing an RRC connection with a network node (such as the first network node 305*x*), the UE 315 may receive the RRC message 900 (such as to suspend or terminate the RRC connection). In some aspects of the disclosure, the RRC message 900 may include one or more selection criteria 902 to enable the UE 315 to perform a selection of another network node for communication. For example, the UE 315 may transmit the message 330 of FIG. 3 in accordance with the one or more selection criteria 902.

To further illustrate, after transmitting the message 330 of FIG. 3, the UE 315 may detect a failure associated with a RACH procedure associated with the second network node 305*y*. The UE 315 may reinitiate the RACH procedure with the first network node 305*x* (or with another network node, such as the third network node 3052) in accordance with the one or more selection criteria 902 and the failure associated with the first RACH procedure.

In some implementations, the one or more selection criteria 902 may include a ranking 904 of non-anchor nodes for the RACH procedure. For example, the non-anchor nodes include the second network node 305*y* and the third network node 305*z*, and the UE 315 may select the second network node 305*y* in accordance with the ranking 904 indicating that the second network node 305*y* is of a higher rank than the third network node 305*z*. Alternatively, or in addition, the non-anchor nodes may include the first non-anchor node 404 and the second non-anchor node 406 of FIG. 4.

Alternatively, or in addition, one or more selection criteria 902 may include an expiration time 906 or a timestamp 908 associated with the ranking 904 of the non-anchor nodes. In some implementations, the expiration time 906 may include an index of a slot, frame, sub-frame, as illustrative examples.

In some other examples, the UE 315 may determine expiration of the ranking 904 of the non-anchor nodes in accordance with the timestamp 908. For example, the timestamp 908 may indicate a time of transmission of the RRC message 900, and the UE 315 may identify the expiration of the ranking 904 in accordance with determining that a particular time period has elapsed since the time of transmission of the RRC message 900.

Figure 10:
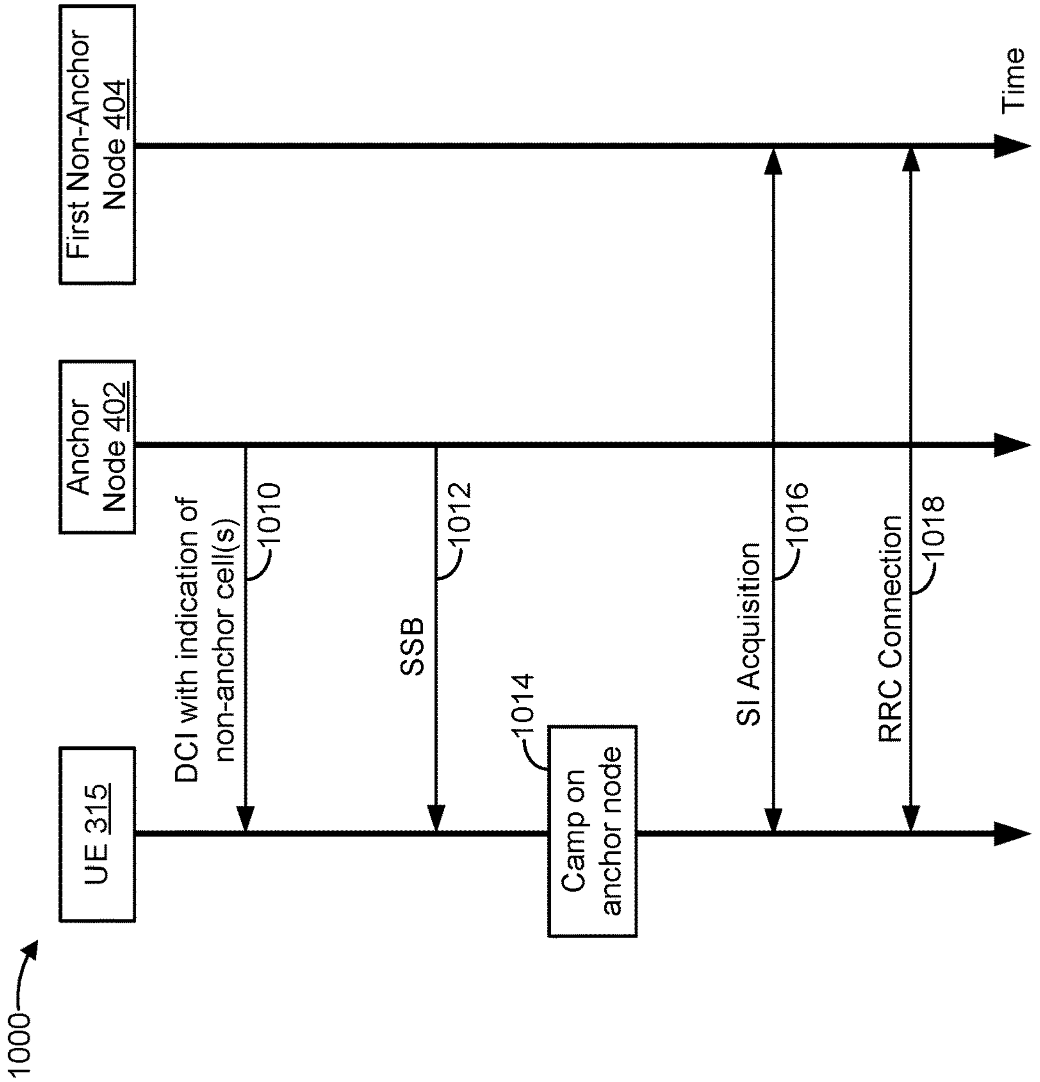
FIG. 10 is a diagram illustrating example operations that support network node selection by a UE according to one or more aspects.

FIG. 10 is a diagram illustrating example operations 1000 that support network node selection by a UE according to one or more aspects. In FIG. 10, the operations 1000 may be described with reference to the UE 315, the anchor node 402, and the first non-anchor node 404. Other examples are also within the scope of the disclosure.

The operations 1000 may include transmitting a downlink control information (DCI) message, at 1010. In some examples, the DCI message may be a DCI message of type 1_0 (DCI 1_0). The DCI message may include an indication of one or more non-anchor nodes which the UE 315 may access. For example, the one or more non-anchor nodes indicated by the DCI message may include the first non-anchor node 404. In some examples, the UE 315 may transmit the message 330 in accordance with the DCI message, such as by selecting the second network node 305*y* for transmission of the message 330 in accordance with the DCI message indicating the second network node 305*y*. In an illustrative example, the DCI message may include a reserved field scrambled with a paging radio network temporary identifier (P-RNTI) such that it indicates an identity of the second network node 305*y* or an access index associated with the second network node 305*y*. In some examples, the DCI message may include a short message field indicating whether the UE 315 is to access a non-anchor node, such as by indicating whether the UE 315 is to perform the transmission of the message 330 to the second network node 305*y*.

The operations 1000 may further include transmitting an SSB, at 1012. The anchor node 402 may transmit the SSB, and one or more UEs may receive the SSB. For example, the UE 315 may receive the SSB.

The operations 1000 may further include camping on an anchor node, at 1014. For example, the UE 315 may camp on the anchor node 402 in accordance with receiving the SSB (at 412).

The operations 1000 may further include performing system information (SI) acquisition with the first non-anchor node, at 1016. For example, the UE 315 may receive SI from the first non-anchor node 404 and may synchronize with the first non-anchor node 404.

The operations 1000 may further include establishing a connection with the first non-anchor node 404, at 1018. For example, the UE 315 may establish an RRC connection with the first non-anchor node 404.

One or more features described with reference to FIGS. 8-10 may improve performance within a wireless communication system. In some cases, performance may be improved using the one or more selection criteria 902, such as by selectively guiding UEs to network nodes to improve load balancing with in a wireless communication system.

Figure 11:
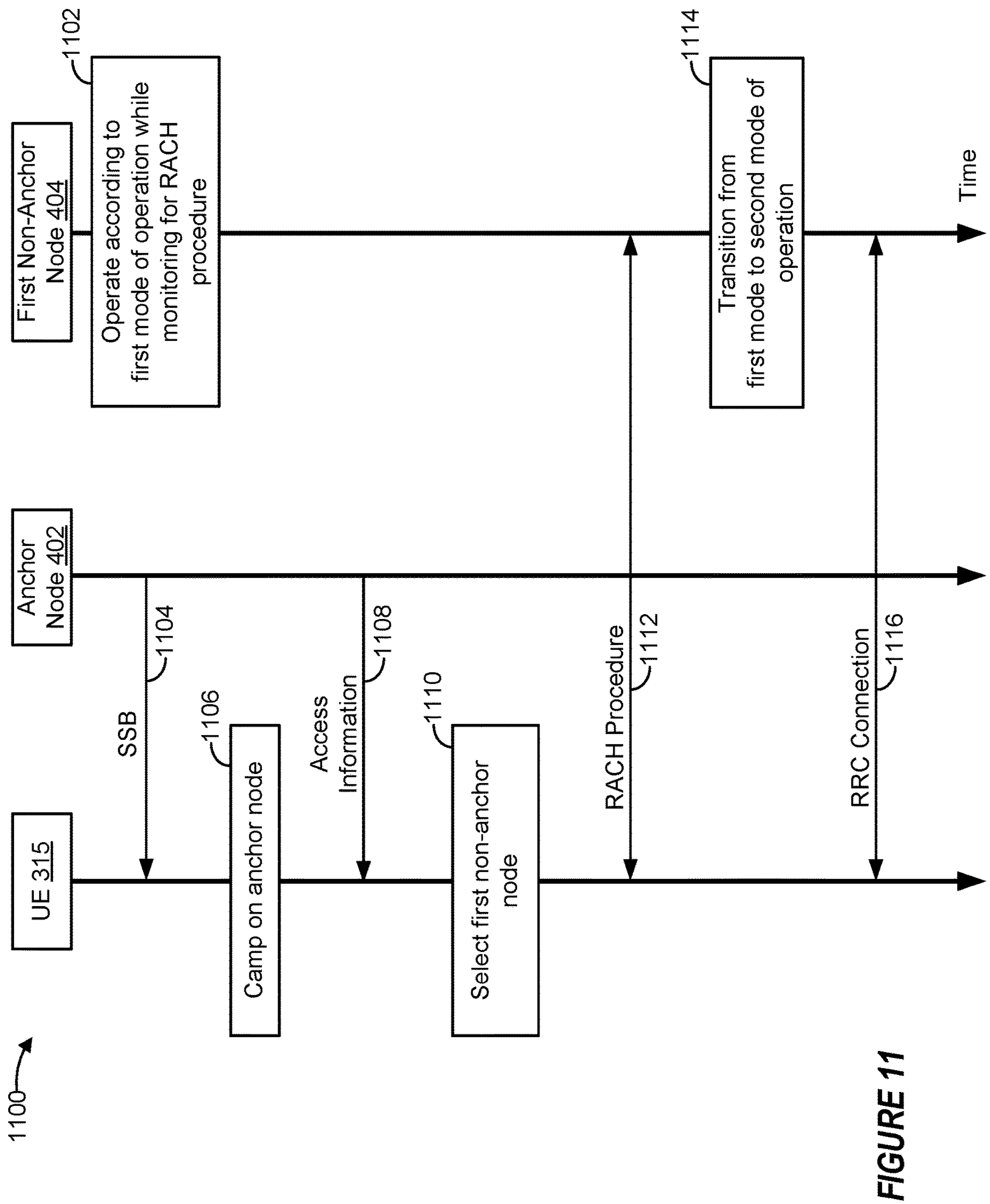
FIG. 11 is a diagram illustrating example operations that support network node selection by a UE according to one or more aspects.

FIG. 11 is a diagram illustrating example operations 1100 that support network node selection by a UE according to one or more aspects. In FIG. 11, the operations 1100 may be described with reference to the UE 315, the anchor node 402, and the first non-anchor node 404. In some examples, the anchor node 402 and the first non-anchor node 404 may correspond to first network node 305*x*, the second network node 305*y*, and the third network node 305*z*, respectively. Other examples are also within the scope of the disclosure.

To further illustrate, the first non-anchor node 404 may operate according to the first mode while monitoring for a RACH procedure, at 1102. For example, the first non-anchor node 404 may operate according to the multiple modes described with reference to FIG. 3. The multiple modes may include the first mode (such as a "sleep" mode) associated with a first power consumption and a second mode (such as an "active" mode) associated with a second power consumption that is greater than the first power consumption. During operation according to the first mode, the first non-anchor node 404 may periodically wake and monitor for one or more communications, such as one or more communications of a RACH procedure. In some implementations, the first mode may correspond to an NES mode.

The operations 1100 may include transmitting an SSB, at 1104. The anchor node 402 may transmit the SSB, and one or more UEs may receive the SSB. For example, the UE 315 may receive the SSB.

The operations 1100 may further include camping on an anchor node, at 1106. For example, the UE 315 may camp on the anchor node 402 in accordance with receiving the SSB (at 1104).

The operations 1100 may further include transmitting access information, at 1108. For example, the anchor node 402 may transmit the access information, and one or more UEs (such as the UE 315) may receive the access information. In some examples, the access information is the access information 320 of FIG. 3.

The operations 1100 may further include selecting the first non-anchor node 404, at 1110. In some examples, the UE 315 may randomly or pseudo-randomly select the first non-anchor node 404 in accordance with the one or more probability values 324. In some other examples, the UE 315 may non-randomly or deterministically select a network node, such as by selecting the first non-anchor node 404 in accordance with an indication of the first non-anchor node 404 that may be included in the access information transmitted at 1108.

The operations 1100 may further include performing a RACH procedure with the first non-anchor node 404, at 1112. In some examples, the RACH procedure is associated with the message 330 of FIG. 2, and performing the RACH procedure includes transmitting the message 330.

The operations 1100 may further include transitioning from the first mode to the second mode of operation, at 1114. For example, the first non-anchor node 404 may enter the second mode in accordance with completing the RACH procedure and to facilitate establishing an RRC connection with the UE 315. In some such examples, the operations 1100 may also include establishing an RRC connection with first non-anchor node 404 after completing the RACH procedure, at 1116.

In some other examples, the UE 315 may not complete the RACH procedure. To illustrate, in some implementations, the UE 315 may receive a message from the first non-anchor node 404 that includes a RACH redirection instruction (such as the RACH redirection instruction described with reference to FIG. 8). In some such examples, the UE 315 may redirect the RACH procedure to one or more other network nodes, such as the anchor node 402 or the second non-anchor node 406.

One or more features described with reference to FIG. 11 may improve performance in a wireless communication system. For example, the first non-anchor node 404 may operate in a low-power mode of operation until transitioning to another mode to establish a connection with the UE 315. As a result, power consumption may be reduced. As an additional example, in some implementations, the UE 315 may "default" to initiating a RACH procedure with one node (such as the anchor node 402) and may "fall back" to another node, such as first non-anchor node 404, in accordance with failure of the RACH procedure with the anchor node. Such a technique may avoid waking a sleeping non-anchor node in some circumstances, reducing power consumption.

Figure 12:
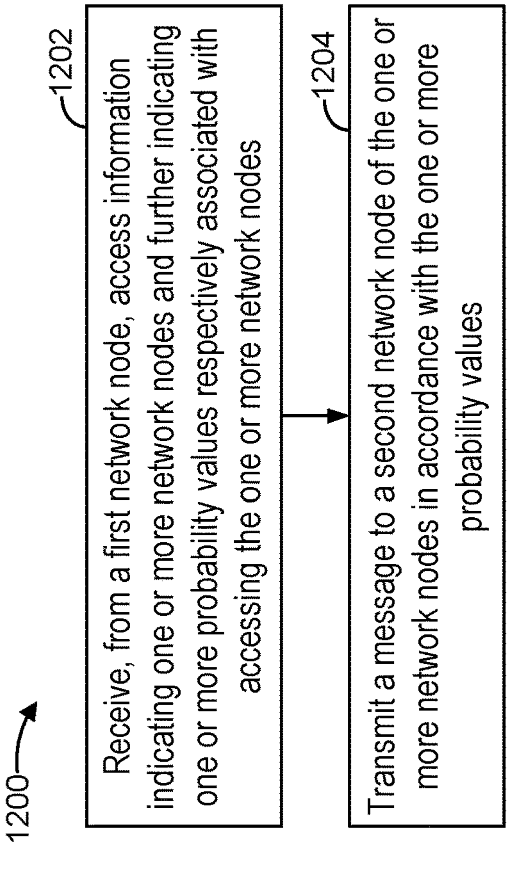
FIG. 12 is a flow diagram illustrating an example process that supports network node selection by a UE according to one or more aspects.

FIG. 12 is a flow diagram illustrating an example process 1200 that supports network node selection by a UE according to one or more aspects. In some examples, the process 1200 is performed by a UE, such as the UE 315.

The process 1200 includes receiving access information from a first network node, at 1202. The access information indicates one or more network nodes and further indicating one or more probability values respectively associated with accessing the one or more network nodes. For example, the UE 315 may receive the access information 320 from the first network node 305*x*, and the access information may indicate the one or more network nodes 322 and the one or more probability values 324.

The process 1200 further includes transmitting a message to a second network node of the one or more network nodes in accordance with the one or more probability values, at 1204. For example, the UE 315 may transmit the message 330 to the second network node 305*y* in accordance with the one or more probability values 324.

Figure 13:
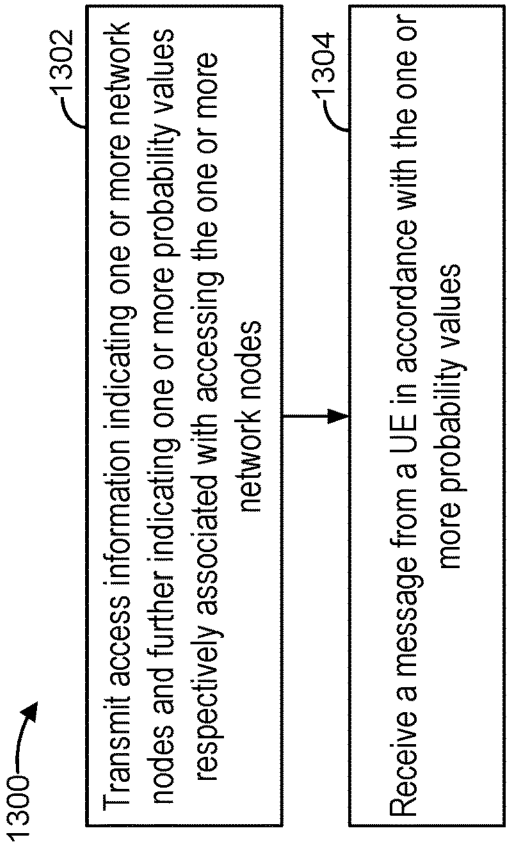
FIG. 13 is a flow diagram illustrating an example process that supports network node selection by a UE according to one or more aspects.

FIG. 13 is a flow diagram illustrating an example process 1300 that supports network node selection by a UE according to one or more aspects. In some examples, the process 1300 is performed by a network node, such as the first network node 305*x*.

The process 1300 includes transmitting access information, at 1302. The access information indicates one or more network nodes and further indicating one or more probability values respectively associated with accessing the one or more network nodes. For example, the first network node 305*x* may transmit the access information 320 indicating the one or more network nodes 322 and the one or more probability values 324.

The process 1300 further includes receiving a message from a UE in accordance with the one or more probability values, at 1304. To illustrate, in some examples, the first network node 305*x* may receive the message 330 from the UE 315. Alternatively or in addition, the message may be received in connection with a RACH procedure, such as described with reference to FIG. 6 (such as at 608) or FIG. 8 (such as at 818), as illustrative examples.

Figure 14:
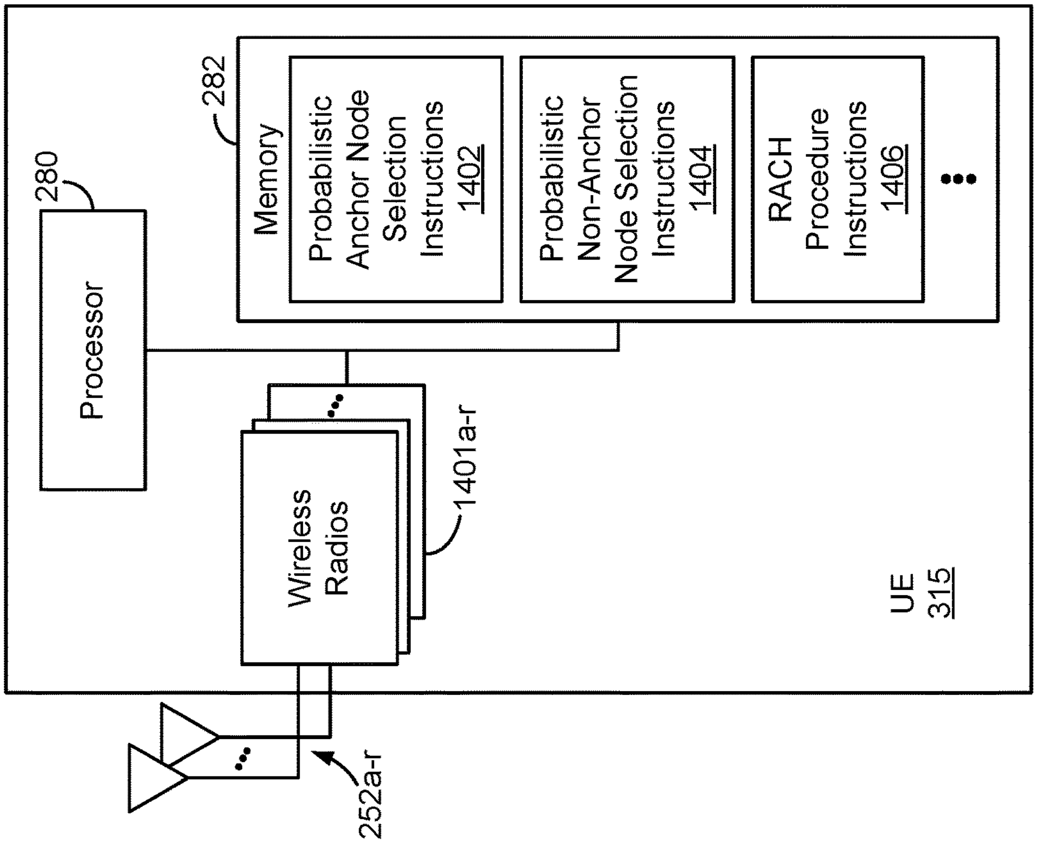
FIG. 14 is a block diagram of an example UE that supports network node selection according to one or more aspects.

FIG. 14 is a block diagram of an example UE 315 that supports network node selection according to one or more aspects. The UE 315 may include structure, hardware, or components illustrated in FIG. 2. For example, the UE 315 may include the processor 280, which may execute instructions stored in the memory 282. Using the processor 280, the UE 115 may transmit and receive signals via wireless radios 1401*a-r* and antennas 252*a-r*. The wireless radios 1401*a-r* may include one or more components or devices described herein, such as the modulator/demodulators 254*a-r*, the MIMO detector 256, the receive processor 258, the transmit processor 264, the TX MIMO processor 266, the transmitter 356, the receiver 358, one or more other components or devices, or a combination thereof.

In some examples, the memory 282 may store instructions executable by one or more processors (such as the processor 280) to initiate, perform, or control one or more operations described herein. For example, the memory 282 may store probabilistic anchor node selection instructions 1402 executable by the processor 280 to perform the anchor node selection operation 362 in accordance with the one or more probability values 324. Alternatively, or in addition, the memory 282 may store probabilistic non-anchor node selection instructions 1404 executable by the processor 280 to perform the non-anchor node selection operation 364 in accordance with the one or more probability values 324. As an additional example, the memory 282 may store RACH procedure instructions 1406 executable by the processor 280 to perform operations associated with one or more RACH procedures described herein.

Figure 15:
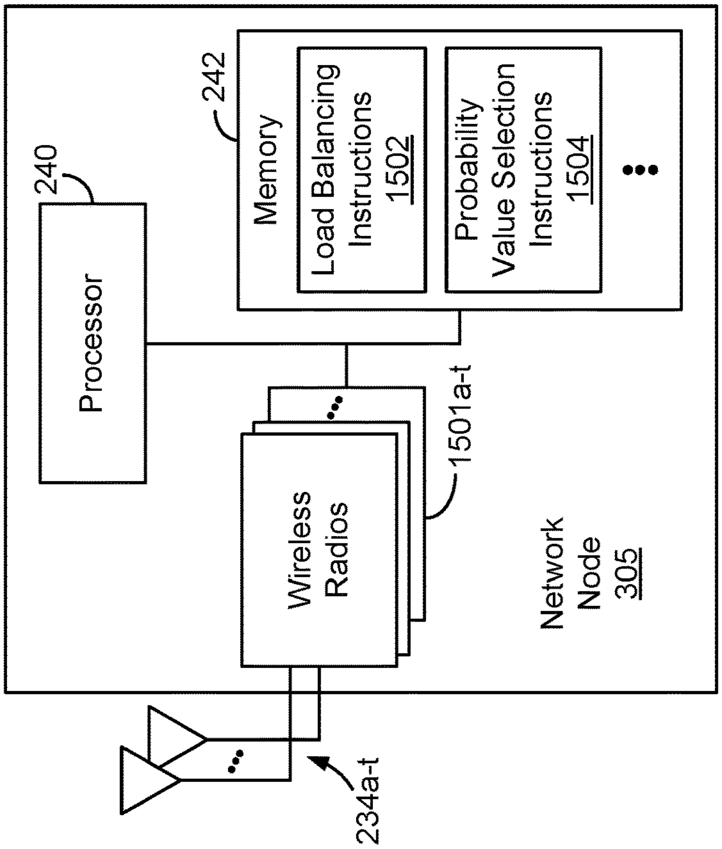
FIG. 15 is a block diagram of an example network node that supports network node selection by a UE according to one or more aspects.

FIG. 15 is a block diagram of an example network node 305 that supports network node selection by a UE according to one or more aspects. The network node 305 may include structure, hardware, and components illustrated in FIG. 2. For example, the network node 305 may include the processor 240, which may execute instructions stored in memory 242. Under control of the processor 240, the network node 305 may transmit and receive signals via wireless radios 1501*a-t* and antennas 234*a-t*. The wireless radios 1501*a-t* may include one or more components or devices described herein, such as the modulator/demodulators 232*a-t*, the MIMO detector 236, the receive processor 238, the transmit processor 220, the TX MIMO processor 230, the transmitter 306, the receiver 308, one or more other components or devices, or a combination thereof.

In some examples, the memory 242 may store instructions executable by one or more processors (such as the processor 240) to initiate, perform, or control one or more operations described herein. For example, the memory 242 may store load balancing instructions 1502 executable by the processor 240 to perform load balancing, such as by identifying a quantity of UEs within a particular area (such as within a cell or within a group of cells) and to assign the UEs to a group of one or more network nodes in order to improve throughput, reduce latency, or reduce power consumption in a wireless communication system. As another example, the memory 242 may store probability value selection instructions 1504 executable by the processor 240 to select the one or more probability values 324 to probabilistically enable assignment of the UEs to the group of one or more network nodes.

According to some further aspects, in a first aspect, a UE for wireless communication includes one or more memories and one or more processors coupled with the one or more memories. The one or more processors individually or collectively are operable to receive, from a first network node, access information indicating one or more network nodes and further indicating one or more probability values respectively associated with accessing the one or more network nodes. The one or more processors individually or collectively are further operable to transmit a message to a second network node of the one or more network nodes in accordance with the one or more probability values.

In a second aspect, alone or in combination with the first aspect, a first probability value of the one or more probability values associated with the second network node is different than a second probability value of the one or more probability values associated with a third network node of the one or more network nodes.

In a third aspect, alone or in combination with one or more of the first aspect or the second aspect, a first probability value of the one or more probability values associated with the second network node is the same as a second probability value of the one or more probability values associated with a third network node of the one or more network nodes.

In a fourth aspect, alone or in combination with one or more of the first aspect through the third aspect, the one or more processors are further individually or collectively operable to receive, during an SI modification time period, an indication of a modified set of the one or more probability values.

In a fifth aspect, alone or in combination with one or more of the first aspect through the fourth aspect, the one or more processors are further individually or collectively operable to transmit the message during operation of the UE according to a connected mode with the second network node. The one or more processors are further individually or collectively operable to maintain the connected mode with the second network node irrespective of receiving additional access information indicating one or more additional probability values.

In a sixth aspect, alone or in combination with one or more of the first aspect through the fifth aspect, the one or more processors are further individually or collectively operable to receive the access information via unicast messaging.

In a seventh aspect, alone or in combination with one or more of the first aspect through the sixth aspect, the second network node is a non-anchor node associated with the UE.

In an eighth aspect, alone or in combination with one or more of the first aspect through the seventh aspect, the one or more processors are further individually or collectively operable to receive the access information via broadcast, groupcast, or multicast messaging, and the second network node is an anchor node associated with the UE.

In a ninth aspect, alone or in combination with one or more of the first aspect through the eighth aspect, the one or more processors are further individually or collectively operable to initiate a threshold quantity of first RACH procedures with the second network node and in accordance with detecting a RACH failure associated with the threshold quantity of first RACH procedures to the second network node, initiate a second RACH procedure to the first network node or to a third network node of the one or more network nodes.

In a tenth aspect, alone or in combination with one or more of the first aspect through the ninth aspect, the one or more probability values are associated with a UE type of the UE.

In an eleventh aspect, alone or in combination with one or more of the first aspect through the tenth aspect, the one or more processors are further individually or collectively operable to receive an indication of a QoS metric associated with at least one of the one or more network nodes and transmit the message further in accordance with the QoS metric.

In a twelfth aspect, alone or in combination with one or more of the first aspect through the eleventh aspect, the access information further indicates whether a UE type is eligible to communicate with the second network node, and the UE is associated with the UE type.

In a thirteenth aspect, alone or in combination with one or more of the first aspect through the twelfth aspect, the one or more probability values are associated with one of a set of anchor nodes or a set of non-anchor nodes, and the access information further includes another set of probability values associated with the other of the set of anchor nodes or the set of non-anchor nodes.

In a fourteenth aspect, alone or in combination with one or more of the first aspect through the thirteenth aspect, the access information further indicates one or more threshold signal strength values respectively associated with the one or more network nodes, and the one or more processors are further individually or collectively operable to transmit the message further in accordance with the one or more threshold signal strength values.

In a fifteenth aspect, alone or in combination with one or more of the first aspect through the fourteenth aspect, the one or more processors are further individually or collectively operable to receive a RACH configuration associated with the second network node and transmit the message further in accordance with the RACH configuration, and the RACH configuration is in accordance with a coverage area that is associated with the second network node.

In a sixteenth aspect, alone or in combination with one or more of the first aspect through the fifteenth aspect, the one or more probability values are indicated in accordance with the one or more threshold signal strength values.

In a seventeenth aspect, alone or in combination with one or more of the first aspect through the sixteenth aspect, the one or more processors are further individually or collectively operable to transmit the message in accordance with a CHO from the first network node to the second network node and further in accordance with the one or more threshold signal strength values.

In an eighteenth aspect, alone or in combination with one or more of the first aspect through the seventeenth aspect, the one or more processors are further individually or collectively operable to initiate a threshold quantity of first RACH procedures with the first network node. The first network node is an anchor node associated with the UE. Transmitting the message includes initiating a second RACH procedure with the second network node in accordance with detecting a RACH failure associated with the threshold quantity of first RACH procedures. The second network node is a non-anchor node associated with the UE.

In a nineteenth aspect, alone or in combination with one or more of the first aspect through the eighteenth aspect, the one or more processors are further individually or collectively operable to, after receiving the access information and prior to transmitting the message, transmit a RACH preamble to the first network node. The one or more processors are further individually or collectively operable to transmit the message further in accordance with the RACH redirection.

In a twentieth aspect, alone or in combination with one or more of the first aspect through the nineteenth aspect, the RACH message is one of msg2 associated with a RACH procedure or a msg4 associated with the RACH procedure.

In a twenty-first aspect, alone or in combination with one or more of the first aspect through the twentieth aspect, the one or more processors are further individually or collectively operable to establish an RRC connection with the first network node and receive an RRC message indicating one or more selection criteria for the UE.

In a twenty-second aspect, alone or in combination with one or more of the first aspect through the twenty-first aspect, the RRC message is one of an RRC release message, an RRC suspend configuration message, or a paging message.

In a twenty-third aspect, alone or in combination with one or more of the first aspect through the twenty-second aspect, the one or more processors are further individually or collectively operable to, after transmitting the message, detect a failure associated with a RACH procedure associated with the second network node. In accordance with the one or more selection criteria and the failure associated with the RACH procedure, reinitiate the RACH procedure with the first network node or with another network node.

In a twenty-fourth aspect, alone or in combination with one or more of the first aspect through the twenty-third aspect, the one or more selection criteria include a ranking of non-anchor nodes for the RACH procedure, and the non-anchor nodes include the second network node.

In a twenty-fifth aspect, alone or in combination with one or more of the first aspect through the twenty-fourth aspect, the one or more selection criteria further include an expiration time associated with the ranking of the non-anchor nodes.

In a twenty-sixth aspect, alone or in combination with one or more of the first aspect through the twenty-fifth aspect, the one or more selection criteria further include a timestamp associated with the ranking of the non-anchor nodes, and the one or more processors are further individually or collectively operable to determine expiration of the ranking of the non-anchor nodes in accordance with the timestamp.

In a twenty-seventh aspect, alone or in combination with one or more of the first aspect through the twenty-sixth aspect, the one or more processors are further individually or collectively operable to receive a DCI message indicating one or more non-anchor nodes including the second network node and transmit the message further in accordance with the indication.

In a twenty-eighth aspect, alone or in combination with one or more of the first aspect through the twenty-seventh aspect, the DCI message includes a reserved field scrambled with a P-RNTI such that it indicates an identity of the second network node or an access index associated with the second network node.

In a twenty-ninth aspect, alone or in combination with one or more of the first aspect through the twenty-eighth aspect, the DCI message includes a short message field indicating whether the UE is to transmit the message with the second network node.

In a thirtieth aspect, alone or in combination with one or more of the first aspect through the twenty-ninth aspect, a method for wireless communication performed by a UE includes receiving, from a first network node, access information indicating one or more network nodes and further indicating one or more probability values respectively associated with accessing the one or more network nodes. The method further includes transmitting a message to a second network node of the one or more network nodes in accordance with the one or more probability values.

In a thirty-first aspect, alone or in combination with one or more of the first aspect through the thirtieth aspect, a first probability value of the one or more probability values associated with the second network node is different than a second probability value of the one or more probability values associated with a third network node of the one or more network node.

In a thirty-second aspect, alone or in combination with one or more of the first aspect through the thirty-first aspect, a first probability value of the one or more probability values associated with the second network node is the same as a second probability value of the one or more probability values associated with a third network node of the one or more network nodes.

In a thirty-third aspect, alone or in combination with one or more of the first aspect through the thirty-second aspect, the method further includes receiving, during an SI modification time period, an indication of a modified set of the one or more probability values.

In a thirty-fourth aspect, alone or in combination with one or more of the first aspect through the thirty-third aspect, the UE transmits the message during operation of the UE according to a connected mode with the second network node, the method further includes maintaining the connected mode with the second network node irrespective of receiving additional access information indicating one or more additional probability values.

In a thirty-fifth aspect, alone or in combination with one or more of the first aspect through the thirty-fourth aspect, the UE receives the access information via unicast messaging.

In a thirty-sixth aspect, alone or in combination with one or more of the first aspect through the thirty-fifth aspect, the second network node is a non-anchor node associated with the UE.

In a thirty-seventh aspect, alone or in combination with one or more of the first aspect through the thirty-sixth aspect, the UE receives the access information via broadcast, groupcast, or multicast messaging, and the second network node is an anchor node associated with the UE.

In a thirty-eighth aspect, alone or in combination with one or more of the first aspect through the thirty-seventh aspect, the method further includes initiating a threshold quantity of first RACH procedures with the second network node. The method further includes, in accordance with detecting a RACH failure associated with the threshold quantity of first RACH procedures to the second network node and initiating a second RACH procedure to the first network node or to a third network node of the one or more network nodes.

In a thirty-ninth aspect, alone or in combination with one or more of the first aspect through the thirty-eighth aspect, the one or more probability values are associated with a UE type of the UE.

In a fortieth aspect, alone or in combination with one or more of the first aspect through the thirty-ninth aspect, the method further includes receiving an indication of a QoS metric associated with at least one of the one or more network nodes. The UE transmits the message further in accordance with the QoS metric.

In a forty-first aspect, alone or in combination with one or more of the first aspect through the fortieth aspect, the access information further indicates whether a UE type is eligible to communicate with the second network node, and the UE is associated with the UE type.

In a forty-second aspect, alone or in combination with one or more of the first aspect through the forty-first aspect, the one or more probability values are associated with one of a set of anchor nodes or a set of non-anchor nodes. The access information further includes another set of probability values associated with the other of the set of anchor nodes or the set of non-anchor nodes.

In a forty-third aspect, alone or in combination with one or more of the first aspect through the forty-second aspect, the access information further indicates one or more threshold signal strength values respectively associated with the one or more network nodes. The UE transmits the message further in accordance with the one or more threshold signal strength values.

In a forty-fourth aspect, alone or in combination with one or more of the first aspect through the forty-third aspect, the method further includes receiving a RACH configuration associated with the second network node. The UE transmits the message further in accordance with the RACH configuration and the RACH configuration is in accordance with a coverage area that is associated with the second network node.

In a forty-fifth aspect, alone or in combination with one or more of the first aspect through the forty-fourth aspect, the one or more probability values are indicated in accordance with the one or more threshold signal strength values.

In a forty-sixth aspect, alone or in combination with one or more of the first aspect through the forty-fifth aspect, the UE transmits the message in accordance with a CHO from the first network node to the second network node and further in accordance with the one or more threshold signal strength values.

In a forty-seventh aspect, alone or in combination with one or more of the first aspect through the forty-sixth aspect, the method further includes initiating a threshold quantity of first RACH procedures with the first network node. The first network node is an anchor node associated with the UE. Transmitting the message includes initiating a second RACH procedure with the second network node in accordance with detecting a RACH failure associated with the threshold quantity of first RACH procedures. The second network node is a non-anchor node associated with the UE.

In a forty-eighth aspect, alone or in combination with one or more of the first aspect through the forty-seventh aspect, the method further includes, after receiving the access information and prior to transmitting the message, transmitting a RACH preamble to the first network node. The method further includes receiving a RACH message from the first network node indicating a RACH redirection instruction. The UE transmits the message further in accordance with the RACH redirection instruction.

In a forty-ninth aspect, alone or in combination with one or more of the first aspect through the forty-eighth aspect, the RACH message is one of a msg2 associated with a RACH procedure or a msg4 associated with the RACH procedure.

In a fiftieth aspect, alone or in combination with one or more of the first aspect through the forty-ninth aspect, the method further includes establishing an RRC connection with the first network node and receiving an RRC message indicating one or more selection criteria for the UE.

In a fifty-first aspect, alone or in combination with one or more of the first aspect through the fiftieth aspect, the RRC message is one of an RRC release message, an RRC suspend configuration message, or a paging message.

In a fifty-second aspect, alone or in combination with one or more of the first aspect through the fifty-first aspect, the method further includes, after transmitting the message, detecting a failure associated with a RACH procedure associated with the second network node. In accordance with the one or more selection criteria and the failure associated with the RACH procedure, the method further includes reinitiating the RACH procedure with the first network node or with another network node.

In a fifty-third aspect, alone or in combination with one or more of the first aspect through the fifty-second aspect, the one or more selection criteria include a ranking of non-anchor nodes for the RACH procedure and the non-anchor nodes include the second network node.

In a fifty-fourth aspect, alone or in combination with one or more of the first aspect through the fifty-third aspect, the one or more selection criteria further include an expiration time associated with the ranking of the non-anchor nodes.

In a fifty-fifth aspect, alone or in combination with one or more of the first aspect through the fifty-fourth aspect, the one or more selection criteria further include a timestamp associated with the ranking of the non-anchor nodes. The method further includes determining expiration of the ranking of the non-anchor nodes in accordance with the timestamp.

In a fifty-sixth aspect, alone or in combination with one or more of the first aspect through the fifty-fifth aspect, the method further includes receiving a DCI message indicating one or more non-anchor nodes including the second network node. The UE transmits the message further in accordance with the indication.

In a fifty-seventh aspect, alone or in combination with one or more of the first aspect through the fifty-sixth aspect, the DCI message includes a reserved field scrambled with a P-RNTI such that it indicates an identity of the second network node or an access index associated with the second network node.

In a fifty-eighth aspect, alone or in combination with one or more of the first aspect through the fifty-seventh aspect, the DCI message includes a short message field indicating whether the UE is to transmit the message with the second network node.

In a fifty-ninth aspect alone or in combination with one or more of the first aspect through the fifty-eighth aspect, a network node for wireless communication includes one or more memories and one or more processors coupled with the one or more memories. The one or more processors individually or collectively are operable to transmit access information indicating one or more network nodes and further indicating the one or more probability values respectively associated with accessing the one more network nodes. The one or more processors individually or collectively are further operable to receive a message from a UE in accordance with the one or more probability values.

In a sixtieth aspect, alone or in combination with one or more of the first aspect through the fifty-ninth aspect, the access information includes a SIB1 message associated with the network node, the SIB1 message including a probability vector indicating the one or more probability values.

In a sixty-first aspect alone or in combination with one or more of the first aspect through the sixtieth aspect, the access information includes a first SIB1 message associated with the network node and including a first probability value of the one or more probability values that is associated with the network node. The access information further includes a second SIB1 message associated with a second network node and including a second probability value of the one or more probability values that is associated with the second network node.

In a sixty-second aspect, alone or in combination with one or more of the first aspect through the sixty-first aspect, a method for wireless communication performed by a network node includes transmitting access information indicating one or more network nodes and further indicating one or more probability values respectively associated with accessing the one or more network nodes. The method further includes receiving a message from a UE in accordance with the one or more probability values.

In a sixty-third aspect, alone or in combination with one or more of the first aspect through the sixty-second aspect, the access information includes a SIB1 message associated with the network node, the SIB1 message including a probability vector indicating the one or more probability values.

In a sixty-fourth aspect, alone or in combination with one or more of the first aspect through the sixty-third aspect, the access information includes a first SIB1 message associated with the network node and including a first probability value of the one or more probability values that is associated with the network node. The access information further includes a second SIB1 message associated with a second network node and including a second probability value of the one or more probability values that is associated with the second network node.

In a sixty-fifth aspect, an apparatus for wireless communications comprises means configured for executing the method of any one of the thirtieth aspect to the fifty-eighth aspect.

In a sixty-sixth aspect, a computer program comprises program instructions which, when the program is executed by a computer, carry out all steps of the method of any one of thirtieth aspect to the fifty-eighth aspect.

In a sixty-seventh aspect, an apparatus for wireless communications comprises means configured for executing the method of any one of the sixty-second aspect to the sixty-fourth aspect.

In a sixty-eighth aspect, a computer program comprises program instructions which, when the program is executed by a computer, carry out all steps of the method of any one of sixty-second aspect to the sixty-fourth aspect.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A. B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) for wireless communication, the UE comprising:
- one or more memories; and
- one or more processors coupled with the one or more memories, the one or more processors individually or collectively operable to:
  - receive, from a first network node, access information indicating one or more network nodes and further indicating one or more probability values respectively associated with accessing the one or more network nodes;
  - perform a probabilistic selection of a second network node from among the one or more network nodes in accordance with the one or more probability values; and
  - in accordance with the probabilistic selection, transmit a message to the second network node.

2. The UE of claim 1, wherein a first probability value of the one or more probability values associated with the second network node is different than a second probability value of the one or more probability values associated with a third network node of the one or more network nodes.

3. The UE of claim 1, wherein a first probability value of the one or more probability values associated with the second network node is the same as a second probability value of the one or more probability values associated with a third network node of the one or more network nodes.

4. The UE of claim 1, wherein the one or more processors are further individually or collectively operable to receive, during a system information (SI) modification time period, an indication of a modified set of the one or more probability values.

5. The UE of claim 1, wherein the one or more processors are further individually or collectively operable to:
- transmit the message during operation of the UE according to a connected mode with the second network node; and maintain the connected mode with the second network node irrespective of receiving additional access information indicating one or more additional probability values.

6. The UE of claim 1, wherein the one or more processors are further individually or collectively operable to receive the access information via unicast messaging.

7. The UE of claim 6, wherein the second network node is a non-anchor node associated with the UE.

8. The UE of claim 1, wherein the one or more processors are further individually or collectively operable to receive the access information via broadcast, groupcast, or multicast messaging, and wherein the second network node is an anchor node associated with the UE.

9. The UE of claim 1, wherein the one or more processors are further individually or collectively operable to:

initiate a threshold quantity of first random access channel (RACH) procedures with the second network node; and in accordance with detecting a RACH failure associated with the threshold quantity of first RACH procedures to the second network node, initiate a second RACH procedure to the first network node or to a third network node of the one or more network nodes.

10. The UE of claim 1, wherein the one or more probability values are associated with a UE type of the UE.

11. The UE of claim 1, wherein the one or more processors are further individually or collectively operable to:

receive an indication of a quality of service (QoS) metric associated with at least one of the one or more network nodes; and transmit the message further in accordance with the QoS metric.

12. The UE of claim 1, wherein the access information further indicates whether a UE type is eligible to communicate with the second network node, and wherein the UE is associated with the UE type.

13. The UE of claim 1, wherein the one or more probability values are associated with one of a set of anchor nodes or a set of non-anchor nodes, and wherein the access information further includes another set of probability values associated with the other of the set of anchor nodes or the set of non-anchor nodes.

14. The UE of claim 1, wherein the access information further indicates one or more threshold signal strength values respectively associated with the one or more network nodes, and wherein the one or more processors are further individually or collectively operable to transmit the message further in accordance with the one or more threshold signal strength values.

15. The UE of claim 14, wherein the one or more processors are further individually or collectively operable to:

receive a random access channel (RACH) configuration associated with the second network node; and transmit the message further in accordance with the RACH configuration, wherein the RACH configuration is in accordance with a coverage area that is associated with the second network node.

16. The UE of claim 14, wherein the one or more probability values are indicated in accordance with the one or more threshold signal strength values.

17. The UE of claim 14, wherein the one or more processors are further individually or collectively operable to transmit the message in accordance with a conditional handover (CHO) from the first network node to the second network node and further in accordance with the one or more threshold signal strength values.

18. The UE of claim 1, wherein the one or more processors are further individually or collectively operable to:

initiate a threshold quantity of first random access channel (RACH) procedures with the first network node, wherein the first network node is an anchor node associated with the UE, wherein transmitting the message includes initiating a second RACH procedure with the second network node in accordance with detecting a RACH failure associated with the threshold quantity of first RACH procedures, and wherein the second network node is a non-anchor node associated with the UE.

19. The UE of claim 1, wherein the one or more processors are further individually or collectively operable to:

after receiving the access information and prior to transmitting the message:

transmit a random access channel (RACH) preamble to the first network node; and receive a RACH message from the first network node indicating a RACH redirection instruction; and transmit the message further in accordance with the RACH redirection instruction.

20. The UE of claim 19, wherein the RACH message is one of a message of type two (msg2) associated with a RACH procedure or a message of type four (msg4) associated with the RACH procedure.

21. The UE of claim 1, wherein the one or more processors are further individually or collectively operable to:

establish a radio resource control (RRC) connection with the first network node; and receive an RRC message indicating one or more selection criteria for the UE.

22. The UE of claim 21, wherein the RRC message is one of an RRC release message, an RRC suspend configuration message, or a paging message.

23. The UE of claim 21, wherein the one or more processors are further individually or collectively operable to:

after transmitting the message, detect a failure associated with a random access channel (RACH) procedure associated with the second network node; and in accordance with the one or more selection criteria and the failure associated with the RACH procedure, reinitiate the RACH procedure with the first network node or with another network node.

24. The UE of claim 23, wherein the one or more selection criteria include a ranking of non-anchor nodes for the RACH procedure, and wherein the non-anchor nodes include the second network node.

25. The UE of claim 24, wherein the one or more selection criteria further include an expiration time associated with the ranking of the non-anchor nodes.

26. The UE of claim 24, wherein the one or more selection criteria further include a timestamp associated with the ranking of the non-anchor nodes, and wherein the one or more processors are further individually or collectively operable to determine expiration of the ranking of the non-anchor nodes in accordance with the timestamp.

27. The UE of claim 1, wherein the one or more processors are further individually or collectively operable to:

receive a downlink control information (DCI) message indicating one or more non-anchor nodes including the second network node; and transmit the message further in accordance with the indication.

28. The UE of claim 27, wherein the DCI message includes a reserved field scrambled with a paging radio network temporary identifier (P-RNTI) such that it indicates an identity of the second network node or an access index associated with the second network node.

29. The UE of claim 27, wherein the DCI message includes a short message field indicating whether the UE is to transmit the message with the second network node.

30. The UE of claim 1, wherein the one or more probability values are a plurality of probability values having a sum that is less than or equal to one hundred percent.

31. The UE of claim 1, wherein the second network node is associated with a network energy savings (NES) mode, and wherein the one or more processors are further operable to:

prior to transmission of the message to the second network node, perform a threshold quantity of random access channel (RACH) procedures with the first network node to avoid waking the second network node from the NES mode; and in accordance with detecting failure of the threshold quantity of RACH procedures, initiate transmission of the message to the second network node.

32. The UE of claim 1, wherein the access information further indicates a UE type that is ineligible to communicate with the one or more network nodes.

33. A method for wireless communication performed by a user equipment (UE), the method comprising:

receiving, from a first network node, access information indicating one or more network nodes and further indicating one or more probability values respectively associated with accessing the one or more network nodes;

performing a probabilistic selection of a second network node from among the one or more network nodes in accordance with the one or more probability values; and in accordance with the probabilistic selection, transmitting a message to the second network node.

34. The method of claim 33, wherein a first probability value of the one or more probability values associated with the second network node is different than a second probability value of the one or more probability values associated with a third network node of the one or more network nodes.

35. The method of claim 33, wherein a first probability value of the one or more probability values associated with the second network node is the same as a second probability value of the one or more probability values associated with a third network node of the one or more network nodes.

36. The method of claim 33, further comprising receiving, during a system information (SI) modification time period, an indication of a modified set of the one or more probability values.

37. The method of claim 33, wherein the UE transmits the message during operation of the UE according to a connected mode with the second network node, the method further comprising maintaining the connected mode with the second network node irrespective of receiving additional access information indicating one or more additional probability values.

38. The method of claim 33, wherein the UE receives the access information via unicast messaging.

39. The method of claim 38, wherein the second network node is a non-anchor node associated with the UE.

40. The method of claim 33, wherein the UE receives the access information via broadcast, groupcast, or multicast messaging, and wherein the second network node is an anchor node associated with the UE.

41. The method of claim 33, further comprising:

initiating a threshold quantity of first random access channel (RACH) procedures with the second network node; and in accordance with detecting a RACH failure associated with the threshold quantity of first RACH procedures to the second network node, initiating a second RACH procedure to the first network node or to a third network node of the one or more network nodes.

42. The method of claim 33, wherein the one or more probability values are associated with a UE type of the UE.

43. The method of claim 33, further comprising receiving an indication of a quality of service (QoS) metric associated with at least one of the one or more network nodes, wherein the UE transmits the message further in accordance with the QoS metric.

44. The method of claim 33, wherein the one or more probability values are associated with one of a set of anchor nodes or a set of non-anchor nodes, and wherein the access information further includes another set of probability values associated with the other of the set of anchor nodes or the set of non-anchor nodes.

45. The method of claim 33, wherein the access information further indicates one or more threshold signal strength values respectively associated with the one or more network nodes, and wherein the UE transmits the message further in accordance with the one or more threshold signal strength values.

46. The method of claim 45, further comprising receiving a random access channel (RACH) configuration associated with the second network node, wherein the UE transmits the message further in accordance with the RACH configuration, and wherein the RACH configuration is in accordance with a coverage area that is associated with the second network node.

47. The method of claim 45, wherein the one or more probability values are indicated in accordance with the one or more threshold signal strength values.

48. The method of claim 45, wherein the UE transmits the message in accordance with a conditional handover (CHO) from the first network node to the second network node and further in accordance with the one or more threshold signal strength values.

49. The method of claim 33, further comprising:

initiating a threshold quantity of first random access channel (RACH) procedures with the first network node, wherein the first network node is an anchor node associated with the UE, wherein transmitting the message includes initiating a second RACH procedure with the second network node in accordance with detecting a RACH failure associated with the threshold quantity of first RACH procedures, and wherein the second network node is a non-anchor node associated with the UE.

50. The method of claim 33, further comprising:

after receiving the access information and prior to transmitting the message:

transmitting a random access channel (RACH) preamble to the first network node; and receiving a RACH message from the first network node indicating a RACH redirection instruction, wherein the UE transmits the message further in accordance with the RACH redirection instruction.

51. The method of claim 50, wherein the RACH message is one of a message of type two (msg2) associated with a RACH procedure or a message of type four (msg4) associated with the RACH procedure.

52. The method of claim 33, further comprising:
establishing a radio resource control (RRC) connection with the first network node; and
receiving an RRC message indicating one or more selection criteria for the UE.

53. The method of claim 52, wherein the RRC message is one of an RRC release message, an RRC suspend configuration message, or a paging message.

54. The method of claim 52, further comprising:
after transmitting the message, detecting a failure associated with a random access channel (RACH) procedure associated with the second network node; and
in accordance with the one or more selection criteria and the failure associated with the RACH procedure, reinitiating the RACH procedure with the first network node or with another network node.

55. The method of claim 54, wherein the one or more selection criteria include a ranking of non-anchor nodes for the RACH procedure, and wherein the non-anchor nodes include the second network node.

56. The method of claim 55, wherein the one or more selection criteria further include an expiration time associated with the ranking of the non-anchor nodes.

57. The method of claim 55, wherein the one or more selection criteria further include a timestamp associated with the ranking of the non-anchor nodes, the method further comprising determining expiration of the ranking of the non-anchor nodes in accordance with the timestamp.

58. The method of claim 33, further comprising receiving a downlink control information (DCI) message indicating one or more non-anchor nodes including the second network node, wherein the UE transmits the message further in accordance with the indication.

59. A network node for wireless communication, the network node comprising:
one or more memories; and
one or more processors coupled with the one or more memories, the one or more processors individually or collectively operable to:
transmit access information indicating one or more network nodes and further indicating one or more probability values respectively associated with accessing the one or more network nodes; and
after probabilistic selection of the network node from among the one or more network nodes in accordance with the one or more probability values, receive a message from a user equipment (UE).

60. The network node of claim 59, wherein the access information includes a system information block of type one (SIB1) message associated with the network node, the SIB1 message including a probability vector indicating the one or more probability values.

61. The network node of claim 59, wherein the access information includes:
a first system information block of type one (SIB1) message associated with the network node and including a first probability value of the one or more probability values that is associated with the network node; and
a second SIB1 message associated with a second network node and including a second probability value of the one or more probability values that is associated with the second network node.

62. A method for wireless communication performed by a network node, the method comprising:
transmitting access information indicating one or more network nodes and further indicating one or more probability values respectively associated with accessing the one or more network nodes; and
after probabilistic selection of the network node from among the one or more network nodes in accordance with the one or more probability values, receiving a message from a user equipment (UE).

63. The method of claim 62, wherein the access information includes a system information block of type one (SIB1) message associated with the network node, the SIB1 message including a probability vector indicating the one or more probability values.

64. The method of claim 62, wherein the access information includes:
a first system information block of type one (SIB1) message associated with the network node and including a first probability value of the one or more probability values that is associated with the network node; and
a second SIB1 message associated with a second network node and including a second probability value of the one or more probability values that is associated with the second network node.

* * * * *